(12) United States Patent
Dal Prà et al.

(10) Patent No.: US 8,061,233 B2
(45) Date of Patent: Nov. 22, 2011

(54) ACTUATION METHOD AND DEVICE FOR A CONTROL CABLE FOR A BICYCLE GEARSHIFT

(75) Inventors: Giuseppe Dal Prà, Venice (IT); Andrea De Pretto, Piovene Rocchette (IT)

(73) Assignee: Campagnolo, S.r.l., Vicenza (IT)

( * ) Notice: Subject to any disclaimer, the term of this patent is extended or adjusted under 35 U.S.C. 154(b) by 1301 days.

(21) Appl. No.: 11/499,545

(22) Filed: Aug. 4, 2006

(65) Prior Publication Data

US 2007/0034037 A1    Feb. 15, 2007

(30) Foreign Application Priority Data

Aug. 4, 2005  (EP) ..................................... 05017003

(51) Int. Cl.
*F16C 1/10*  (2006.01)

(52) U.S. Cl. ...................................................... 74/502.2

(58) Field of Classification Search ................. 74/473.1, 74/473.13, 473.14, 473.15, 473.3, 489, 500.5, 74/501.6, 502.2
See application file for complete search history.

(56) References Cited

U.S. PATENT DOCUMENTS

| 4,454,784 | A | * | 6/1984 | Shimano ...................... 74/473.1 |
| 4,885,951 | A | | 12/1989 | Desenclos et al. |
| 5,094,120 | A | | 3/1992 | Tagawa |
| RE34,007 | E | * | 7/1992 | Desenclos et al. ........... 74/502.2 |
| 5,222,412 | A | * | 6/1993 | Nagano ........................ 74/502.2 |
| 5,791,195 | A | | 8/1998 | Campagnolo |
| 5,921,140 | A | | 7/1999 | Lemmens et al. |
| 6,502,477 | B1 | * | 1/2003 | Assel ........................... 74/502.2 |
| 6,792,826 | B2 | | 9/2004 | Dal Pra |

FOREIGN PATENT DOCUMENTS

| EP | 1 564 131 A1 | 8/2005 |
| GB | 2 012 893 A | 8/1979 |

* cited by examiner

*Primary Examiner* — Vicky Johnson
(74) *Attorney, Agent, or Firm* — Volpe and Koenig, P.C.

(57) ABSTRACT

A method for carrying out gearshifting of a bicycle derailleur through an actuation device is described that utilizes a mobile mechanical member to control the derailler. Every gearshifting operation corresponds to a movement of predetermined amount of the mobile member. The method is carried out by the steps of an active initial movement of the mobile member for a first amount equal to only a portion of the amount of the movement corresponding to gearshifting; and an automatic final movement of the mobile member for a second amount equal to the remaining portion of the amount of the movement corresponding to gearshifting. Devices capable of implementing such a method are also described.

39 Claims, 20 Drawing Sheets

ACTUATION METHOD AND DEVICE FOR A CONTROL CABLE FOR A BICYCLE GEARSHIFT

FIELD OF THE INVENTION

The present invention concerns a method for carrying out gearshifting in a bicycle gearshift or derailleur and an actuation device for a control cable for a bicycle derailleur that implements such a method. The following description is made mainly with reference to devices particularly designed for bicycles with straight handlebars (typical of mountain bikes), but the invention is clearly independent of the shape of the handlebars and of the consequent design of the actuation device; therefore, the invention can also be used in devices for racing bicycles, with curved handlebars. The following description is made, in particular, with reference to an integrated control device, in other words a mechanism that also controls the brake cable.

BACKGROUND

A bicycle is normally provided with a rear derailleur associated with the pinion group, which consists of a series of coaxial toothed wheels (crowns), having different diameters and numbers of teeth, integral with the hub of the rear wheel.

A bicycle is typically also provided with a front derailleur associated with the chainset, which consists of a series of toothed wheels (crowns) having different diameters and numbers of teeth, associated with a shaft of the crank axle rotated by a pair of pedals.

In both cases, the derailleur engages a transmission chain extending in a closed ring between the pinion group and the chainset, moving it on to sprockets having different diameters and number of teeth, so as to obtain different transmission ratios.

In particular, downward gearshifting or downshifting refers to when the chain passes from a sprocket having a larger diameter to a sprocket having a smaller diameter, and upward gearshifting or upshifting refers to when the chain moves from a sprocket having a smaller diameter to a sprocket having a greater diameter. In this respect, it should be noted that with reference to the front derailleur, downward gearshifting corresponds to the passage to a lower transmission ratio and upward gearshifting corresponds to the passage to a higher transmission ratio, vice-versa with reference to the rear derailleur, downward gearshifting corresponds to the passage to a higher transmission ratio and upward gearshifting corresponds to the passage to a lower transmission ratio.

The movement in the two directions of a derailleur is obtained through an actuation device mounted to allow easy operation for the cyclist, i.e. normally on the handlebars, close to the handlebar grip where the brake lever for commanding the braking of the front or rear wheel is also located. Control devices that allow both a derailleur to be driven in the two directions and a brake to be controlled are, as mentioned above, commonly known as integrated controls.

Customarily, the actuation device of the front derailleur and the brake lever of the front wheel are located by the left-hand grip of the handlebars, and vice-versa the actuation device of the rear derailleur and the brake lever of the rear wheel are located by the right-hand grip.

More specifically, in a mechanical gearshift, each derailleur is moved between the sprockets, in a first direction by a traction action exerted by a normally sheathed inextensible cable (commonly known as Bowden cable), in an opposite second direction by the release of the traction of the cable and/or by the elastic return action of a spring provided in the derailleur itself.

Normally, the direction in which the movement is determined by the release of the traction of the cable and/or by the return spring is that of downward gearshifting; vice-versa, the traction action of the control cable takes place in the direction of upward gearshifting, in which the chain moves from a sprocket having a smaller diameter to a sprocket having a larger diameter.

In the actuation device, the control cable is actuated in traction or in release through winding and unwinding on a rotor element, commonly known as cable-winding drum, the rotation of which is controlled by the cyclist by a pair of suitable control levers.

In any case, the actuation device must provide that the drum be held still in rotation in a number of predetermined angular positions, corresponding to the different positions of the derailleur required by the different ratios, i.e. on the different sprockets of the transmission. Therefore, the actuation device of a front derailleur has a relatively low number of predetermined angular positions (typically three), corresponding to the positions of the front derailleur on the different crowns of the chainset; a rear gearshift, on the other hand, has a relatively high number of predetermined angular positions (typically from seven to ten), corresponding to the positions of the rear derailleur on the different pinions.

So called "release-type" actuation systems are known in which the rotation of the cable-winding drum, where the cable is wound up, takes place as a result of the physical effort exerted by the cyclist on the appropriate upshift lever, whereas the rotation in the opposite direction is obtained by actuating the downshift lever, substantially freeing the cable-winding drum and allowing a return spring, which can be that of the derailleur as well as a return spring connected to the cable-winding drum inside the mechanism itself, to act in the direction to unwind the cable from the drum, clearly in a controlled manner.

A first release-type device is one in which the downshift lever is in the form of a button. The drum is kept in fixed position by a pawl that engages the teeth present on the outer surface of the cable-winding drum. The pressing of the button keeps the cable-winding drum locked in position while it allows the disengagement of the pawl from the teeth of the drum. The subsequent release towards the neutral rest position of the button allows the free rotation of the drum under the thrust of a coil spring mounted coaxial to the drum, while simultaneously the pawl engages the subsequent tooth of the cable-winding drum, locking it in the new position after the desired angular rotation.

A first drawback of such a device is that downward gearshifting is not sufficiently quick upon actuation by the cyclist, since it does not take place when the button is pressed but rather essentially in the step of releasing the button.

Another drawback is that to effect multiple downshifts, it is necessary to carry out multiple individual consecutive downward gearshifting operations.

A second release-type device is one in which the cable-winding drum is kept in position by a lever that engages at its first end the teeth present on the outer surface of the cable-winding drum. The thrusting actuation of the downshift lever allows the disengagement of the first end of the lever from the teeth of the cable-winding drum, the free rotation of the cable-winding drum for an amount of rotation equal to about half the desired rotation and the engagement of the second end of the lever on the teeth of the outer surface of the drum. The subsequent release of the downshift lever towards the neutral rest position determines the free rotation of the cable-winding drum for the second amount of rotation, which completes gearshifting, and the reengagement of the first end of the lever on the outer teeth of the drum.

In such a device downward gearshifting is also not sufficiently quick upon actuation by the cyclist, since it takes place substantially in two steps corresponding to the pushing and to the release of the lever and gearshifting is complete only after release of the downshift lever and its return to the neutral rest position.

As in the previous example, another drawback is that to effect multiple downshifts, it is necessary to carry out multiple individual consecutive downward gearshifting operations.

So called "active-type" actuation devices are also known in which the rotation of the cable-winding drum both in the sense of winding of the cable and in the sense of unwinding of the cable takes place by the physical force exerted by the cyclist on the appropriate upshift and downshift levers or by a servomechanism activated by the cyclist.

A known active-type device is one in which upshift and downshift levers act by actively thrusting on the cable-winding drum to place it in rotation for the entire angular extension defined between two adjacent gearshift positions. In particular, to carry out downward gearshifting, the lever must be rotated until the cable-winding drum reaches its desired final position, where it is locked in position by an indexing means.

A first drawback of such a device is that downward gearshifting is not sufficiently quick upon actuation by the cyclist, since it is only completed when the downshift lever has carried out a sufficient rotation to take the cable-winding drum into the final position.

Another drawback is that if the downshift lever is not pushed by a sufficiently large angle to take the cable-winding drum in rotation into the new gearshifting position, gearshifting is not completed and the derailleur remains in a disadvantageous intermediate position between two sprockets.

The problem at the basis of the invention is that of allowing quicker and more precise gearshifting operations to be carried out compared to known actuation devices.

SUMMARY

In a first aspect, the invention concerns in particular a method for carrying out gearshifting in a bicycle gearshift through an actuation device that comprises a mobile mechanical member for controlling the gearshift, in which each gearshifting operation corresponds to a movement of predetermined amount of the mobile member, the method comprising an active initial movement of the mobile member for a first amount equal to only a portion of the amount of the movement corresponding to gearshifting; and an automatic final movement of the mobile member for a second amount equal to the remaining portion of the amount of the movement corresponding to gearshifting.

This method allows the cyclist to obtain the desired gearshifting particularly quickly, minimizing the time in which he has to take his attention away from riding and pedaling to carry out gearshifting itself.

BRIEF DESCRIPTION OF THE DRAWINGS

Further characteristics and advantages of the invention shall become clearer from the following description of preferred embodiments thereof, made with reference to the attached drawings. In such drawings FIGS. 1 to 8 concern an actuation device of the control cable of a front gearshift (left-hand control), FIGS. 9 to 16 concern an actuation device of the control cable of a rear gearshift (right-hand control), both structurally integrated with a brake control device.

FIG. 17 is a view analogous to FIG. 5, which shows the indexer or holding assembly of an alternative embodiment;

FIG. 18 is a plan view of the indexer of FIG. 17, analogous to FIG. 6a, 6b;

FIG. 19 is a section view of a device specifically for curved handlebars, with indexer of an alternative embodiment of the invention.

DETAILED DESCRIPTION OF THE PREFERRED EMBODIMENTS

Introduction to the Embodiments

Figure 1:
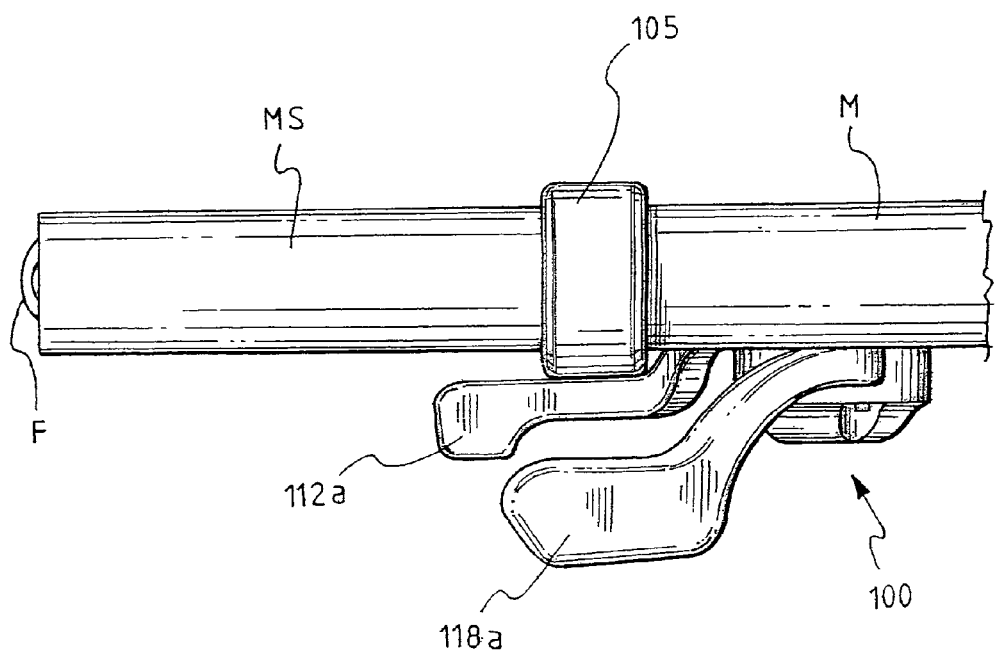
FIG. 1 is a view of an actuation device of the cable of a front gearshift (left-hand device), mounted on straight handlebars, from the cyclist's point of view.

In a first aspect, the invention concerns in particular a method for carrying out gearshifting in a bicycle gearshift through an actuation device that comprises a mobile mechanical member for controlling the gearshift, in which each gearshifting operation corresponds to a movement of predetermined amount of the mobile member, the method comprising an active initial movement of the mobile member for a first amount equal to only a portion of the amount of the movement corresponding to gearshifting; and an automatic final movement of the mobile member for a second amount equal to the remaining portion of the amount of the movement corresponding to gearshifting.

Preferably, such a method is used for downward gearshifting, because normally the return spring of the gearshift acts actually in downward gearshifting. However, there are also gearshifts in which the return spring acts in upward gearshifting, and in such a case the method of the invention can be used for upward gearshifting.

Preferably, the second amount of movement is greater than the first amount, more preferably it is equal to at least twice the first amount. More generally, to promote quickness of gearshifting, the second amount has the maximum extension allowed by the structural and constructive characteristics of the mechanical members of the device.

Preferably, the initial movement is carried out by the cyclist, by acting with one of his or her fingers on an appropriate lever of the actuation device and thus directly causing the movement of the mobile member.

Alternatively, it is possible for the initial movement to be carried out by a servomechanism activated by the cyclist. The cyclist activates such a servomechanism, for example through a button, in such a way making the servomechanism actuate the mobile member not for all of the movement corresponding to gearshifting, but only for the initial movement.

Preferably, the final movement, on the other hand, is carried out automatically by the actuation device, once the initial movement has been carried out, without requiring a further direct thrust by the cyclist or by a servomechanism.

Preferably, the final movement is carried out automatically by the actuation device, under mechanical action of a return spring; such a spring can be inside the actuation device or, more typically, it can be a return spring of the derailleur in the gearshift.

The mechanical member that in the actuation device is mobile to control the gearshift can be of various types; typically and preferably, it is a drum for winding a control cable of the gearshift, and therefore each said movement is an angular movement of the drum.

In its second aspect, the present invention concerns in particular an actuation device for a control cable for a bicycle gearshift, the actuation device comprising: a casing, attachable to a bicycle's handlebar, a cable-winding drum, angularly mobile in the casing about a main axis of the device, an actuator, active on the drum to rotate it in first and second angular directions about the main axis of the device, an indexer or holding assembly that releasably holds the drum in predetermined angular positions against the return action in the second angular direction exerted by a biasing member. The indexer comprises a first rotary member integral in rotation with the drum and a second stationary member integral with the casing, in which one of the first and second member is provided with a pointer engaged on a hooking outline formed on the other member, the hooking outline comprising a plurality of stop positions corresponding to the predetermined angular positions of the drum and a plurality of free sliding paths, in which the shape and location of the stop positions and of the free sliding paths are such that the rotation of the drum in the second angular direction provides an active initial movement step, in which the rotary member can move only if forced in rotation by the actuator so that the pointer is taken to disengage from a stop position, and an automatic final movement step, in which the rotary member is free to rotate in the second direction without the need for further action by the actuator, with the pointer that runs along the free sliding path that follows, in the second direction, the stop position from which it has been disengaged, until the subsequent stop position.

As shall become clearer after reading the following detailed description of preferred embodiments of the invention, the provision of free sliding paths allows—during downward gearshifting—the rotation of the drum corresponding to an individual gearshifting operation (i.e. from one gear ratio to the immediately adjacent gear ratio) to be divided into a first active pushing step, in which the rotation of the cable-winding drum is caused by the cyclist pushing (or by a servomechanism activated by the cyclist), followed by a second automatic rotation step, in which the rotation of the drum corresponding to gearshifting continues and is completed automatically even without an active push.

Such a device is thus suitable for implementing a method according to the first aspect of the invention, as shall become clearer hereafter.

Preferably, each free sliding path has an angular extension of over 50% of the angular extension between the two stop positions adjacent to it, and even more preferably equal to about ⅔ of such an extension. In general, the greater the extension of the free sliding path, the quicker the gearshifting, because the active actuation step is shorter.

Preferably, the indexer comprises a disc provided with said pointer, flanked on at least one of its opposite sides by a disc provided with said hooking outline, in which the pointer is an element projecting in the axial direction from the disc on which it is provided and in which the hooking outline is defined at a recess formed in the disc on which it is provided. The stationary member can comprise the disc provided with the pointer and the rotary member can comprise the disc provided with the hooking outline, or vice-versa.

Preferably, a pair of pointers and a corresponding pair of hooking outlines are provided, so as to ensure that the device is sufficiently strong.

Preferably, the actuator comprises:
a first operating mechanism, active on the drum to rotate it in the first angular direction,
a second operating mechanism, active on the drum to rotate it in the second angular direction opposite the first;
and the indexer comprises:
first counteraction means, to counteract the rotation of the drum in the first direction,
second counteraction means, to counteract the rotation of the drum in the second direction.

Therefore, the clearly asymmetrical influence of the return spring of the derailleur on the actuation device can be balanced better, with a corresponding asymmetric action in the opposite direction of the indexer.

Preferably, the first or the second counteraction means—and even more preferably both—counteract the rotation of the drum regardless of the angular position of the drum itself. By this it is meant that the counteraction means counteract the rotation of the drum with the same force for the different gearshifting operations, both between low gear ratio positions and between high gear ratio positions. For example, to pass from the first to the second position the same counteraction force has to be overcome as the one that has to be overcome to pass from the third position to the fourth position.

The pointer can be of various designs. Preferably, the pointer is a ball and the disc provided with the pointer is a ball-carrying disc, mounted in the casing and provided with at least one radial slot, with said ball mounted in said radial slot so as to be pushed radially outwards by the first counteraction means, the slot being open on at least one side of the ball-carrying disc and having a depth such that the ball projects in the axial direction from the ball-carrying disc, the disc provided with the hooking outline being a first indexing disc, mounted in the casing in a position flanking and adjacent to the ball-carrying disc, towards the side thereof from which the ball projects, and provided with said recess in which the ball is engaged. This design and in particular, the use of a ball as pointer, allows friction to be kept low, above all at the free sliding paths.

The recess formed in the indexing disc can have different designs, and consequently the hooking outline can have different progressions. For example and preferably, the recess formed in the first indexing disc comprises stop zones interspaced with sliding zones, each of these in turn comprising a circumferential free sliding section and an inclined sliding section, and the stop positions of the hooking outline are defined in the stop zones of the recess and the free sliding paths are defined along the circumferential free sliding sections.

Preferably, the first counteraction means comprise a first counteraction spring that acts upon the ball in the radial slot of the ball-carrying disc to keep the ball itself in a stop zone in the recess, thus making the stationary member and the rotary member integral in rotation. Preferably, the second counteraction means comprise a second counteraction spring mounted in the casing so as to axially bias the first indexing disc and the ball-carrying disc against each other.

The use of two distinct springs to bias the spring to counteract the rotation of the drum in the two directions allows a differentiation of the counteraction means to be achieved in a simple manner.

Preferably, to obtain asymmetrical behavior, an intermediate one of the stop zones is delimited by a stop wall oriented in a stop direction and by a circumferential sliding wall oriented circumferentially about the axis of the device.

Thus, the stop wall is undercut with respect to the radial direction, i.e. the direction of such a wall makes an acute angle (small in size, just more than zero is sufficient) with respect to the radial direction, and such an acute angle faces backwards with respect to the relative movement of the ball that pushes in the circumferential direction on such a wall. Such an orientation prevents the ball pushed circumferentially on the wall by a rotation action of the drum from being able to move.

Preferably, each of the sliding zones is delimited—at the circumferential free sliding section—by said circumferential sliding wall and—at the inclined sliding section—by an inclined sliding wall oriented in an inclined sliding direction, the stop direction of a stop zone and the sliding direction of the inclined sliding section separated from the aforementioned stop zone by a circumferential free sliding section defining an acute angle that does not enclose the main axis of the device.

Thus, the direction of the inclined sliding wall makes an acute angle with respect to the radial direction, and such an acute angle faces forwards with respect to the relative movement of the ball that pushes on such a wall in the circumferential direction. Such an orientation allows the ball pushed circumferentially on the wall by a rotation action of the drum to follow the wall itself, moving in the slot towards the inside of the ball-carrying disc.

Preferably, the stop walls are joined to the sliding walls in a succession that forms an outer peripheral margin of the recess on the indexing disc. Such a recess may or may not be delimited towards the inside by an inner peripheral margin corresponding to the outer peripheral margin; such an inner margin, in any case, is not operative.

Preferably, two opposite indexing discs can be provided, which together cooperate with the ball-carrying disc on opposite sides thereof. For such a purpose, therefore:

the slot in the ball-carrying disc is open on both sides of the disc and has a depth such that the ball projects in the axial direction from the ball-carrying disc, from both sides thereof;

the indexer also comprises a second indexing disc integral in rotation with the first indexing disc, mounted in the casing in a position flanking and adjacent to the ball-carrying disc on the opposite side with respect to the first indexing disc and provided with a recess mirroring that of the first indexing disc; and the ball, projecting axially from the slot on the ball-carrying disc, is engaged both in the recess on the first indexing disc, and in the recess on the second indexing disc.

The presence of two indexing discs ensures that the device is more balanced and more effective.

Equally, more balance and more effectiveness are preferably obtained by using not just one ball but two balls, operating substantially in parallel and preferably in positions 180° opposite. The use of a greater number of balls is also theoretically possible and advantageous, of course under the condition that on the indexing discs there is sufficient angular space to house the necessary recesses; this means that the complete stroke of the control cable between the extreme positions of the derailleur must be such as to be obtained with a rotation of the cable-winding drum of less than 120° (so as to be able to provide three balls) or even of less than 90° (for four balls), or else under the condition that a transmission be provided with a gear ratio different to 1:1 between the rotation of the drum and the relative angular movement between ball-carrying disc and indexing disc (or discs), or else furthermore under the condition that staggered action planes be provided for different balls.

Preferably, the first counteraction spring can be simply a helical spring compressed between the ball and an abutment on the ball-carrying disc, or a foil spring (or leaf spring) suitably anchored on such a disc; in the case in which two opposite balls are used, it is preferred to use a single leaf spring suitably shaped and arranged between the two balls. These solutions are effective and constructively simple.

Preferably, the second counteraction spring is a Belleville spring (also known as Belleville washer), which thanks to its low bulk in the axial direction allows the size of the actuation device to be kept sufficiently small, whilst still providing an elastic action even of very high intensity.

In a preferred embodiment, the indexer comprises a disc provided with said pointer, flanked on at least one of its two opposite sides by a disc provided with said hooking outline, the pointer is an element projecting in the axial direction from the disc on which it is provided, and the hooking outline is defined along a groove extending circumferentially, having variable depth between a minimum value and a maximum value. This design allows for an indexer that is particularly strong and simple to make.

Also in this embodiment, the stationary member can comprise the disc provided with the pointer and the rotary member can comprise the disc provided with the hooking outline, or vice-versa, as well as a pair of pointers and a corresponding pair of hooking outlines can be provided.

The pointer can be of various designs also here. Preferably, the pointer is a ball and the disc provided with the pointer is a ball-carrying disc having a through seat in which said ball is housed, the ball having a diameter greater than the thickness of the ball-carrying disc and projecting from the disc itself on both sides thereof, and the disc provided with the hooking outline is a first indexing disc, mounted in the casing in a position flanking and adjacent to the ball-carrying disc, towards the side thereof from which the ball projects, and provided with said groove in which the ball is engaged. This configuration and in particular the use of a ball as pointer allows the frictions to be kept low, above all at the free sliding paths.

Preferably, the groove comprises stop zones interspaced by sliding zones, each of these in turn comprising a deep section adjacent to the stop zone and an inclined section adjacent to the deep section; the depth of the groove has its maximum value in the stop zones and in the deep sections, whereas it is variable from the minimum value to the maximum value in the inclined sections. With this configuration, after the pointer has been disengaged from the stop zone, not only is the rotary member free to rotate in the second angular direction under the action of the return spring of the gearshift, but even such a rotation is initially promoted by the inclined section.

In a particularly preferred configuration in a racing bicycle gearshift, with curved handlebars, the rotary member of the indexer comprises a sprocket on the periphery of which the hooking outline is defined, the pointer consisting of an end of a needle spring mounted in the casing in front of the periphery of the sprocket. This demonstrates that it is possible to exploit the advantages of the present invention also in a typical racing bicycle gearshift; the hooking outline shall clearly be designed according to the invention, with stop zones and free sliding zones instead of the conventional teeth separated by grooves substantially similar and opposite in shape with respect to the teeth.

DETAILED DESCRIPTION

The description of the right and left actuation device is made with reference to an actuation device for integrated straight handlebars, i.e. in which the actuation device is associated with the brake control lever. However, it should be understood that such a device could constitute an independent body, applicable to the handlebars of the bicycle preferably near the brake lever.

Figure 2:
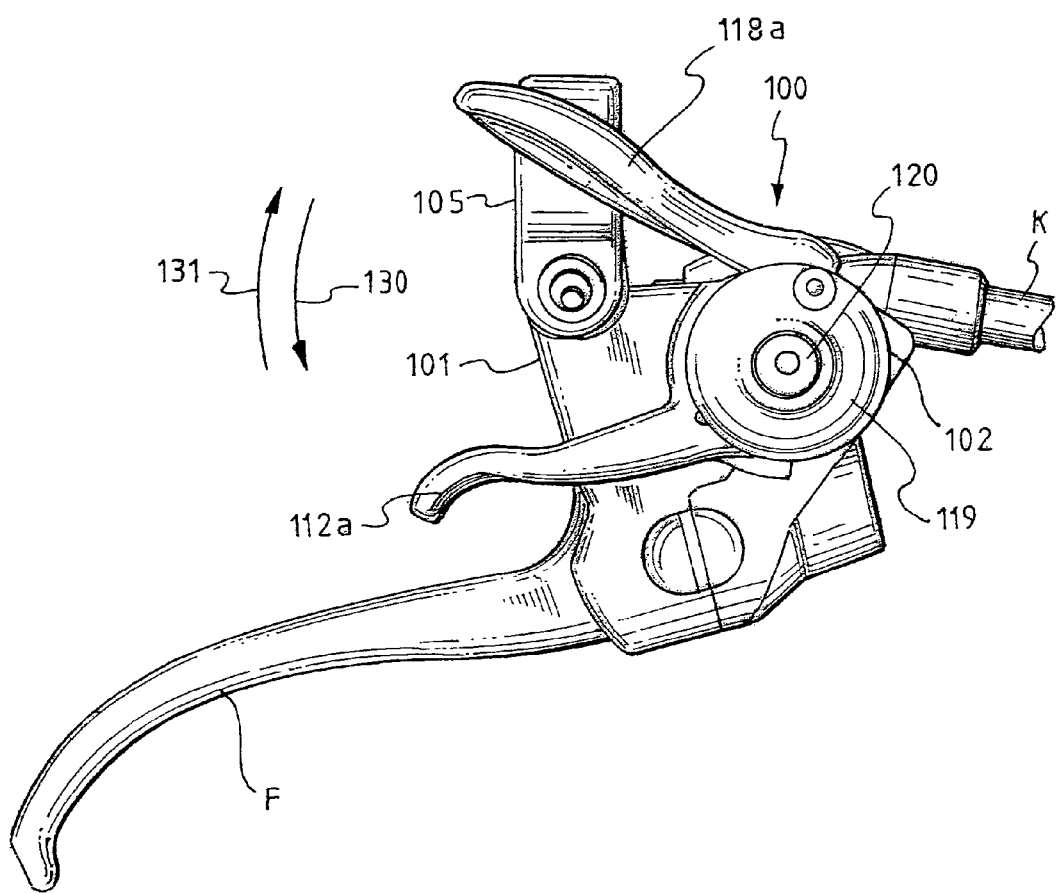
FIG. 2 is a view from below of the device of FIG. 1, shown without handlebars.

FIGS. 1 to 8 show, as a first embodiment of the invention, an actuation device 100 of the control cable K of a front gearshift (not shown). With particular reference to FIGS. 1 and 2, the device 100 is mounted near the left-hand grip MS of a bicycle's handlebar M; the handlebar M shown is a straight handlebar, normally used for mountain bikes. As stated, obviously, the embodiment of the invention of the device 100 is not limited to application to such handlebars, nor to being arranged on the left-hand side thereof.

Figure 3:
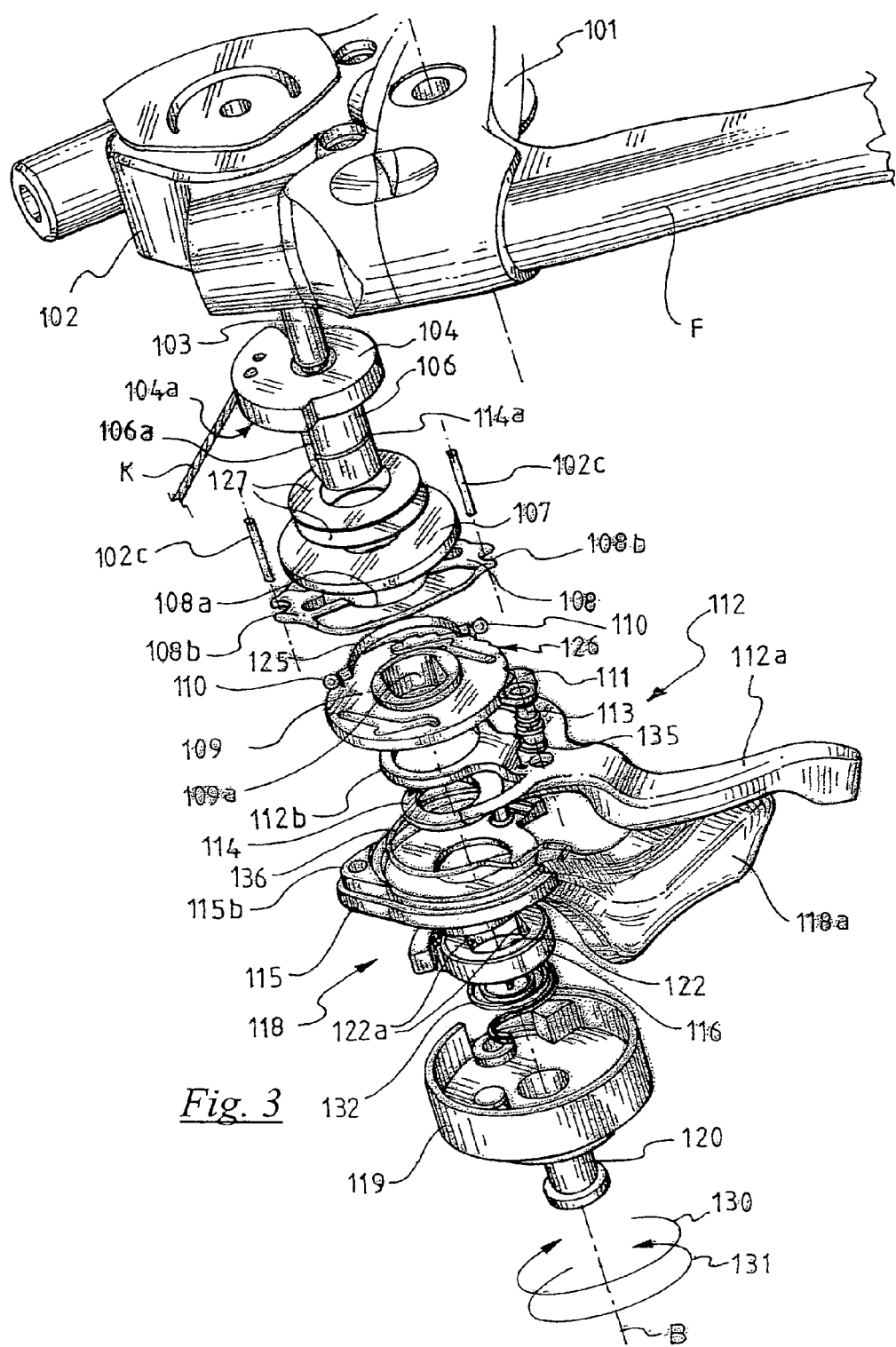
FIG. 3 is an exploded perspective view from above of the device of FIG. 1.
Figure 4:
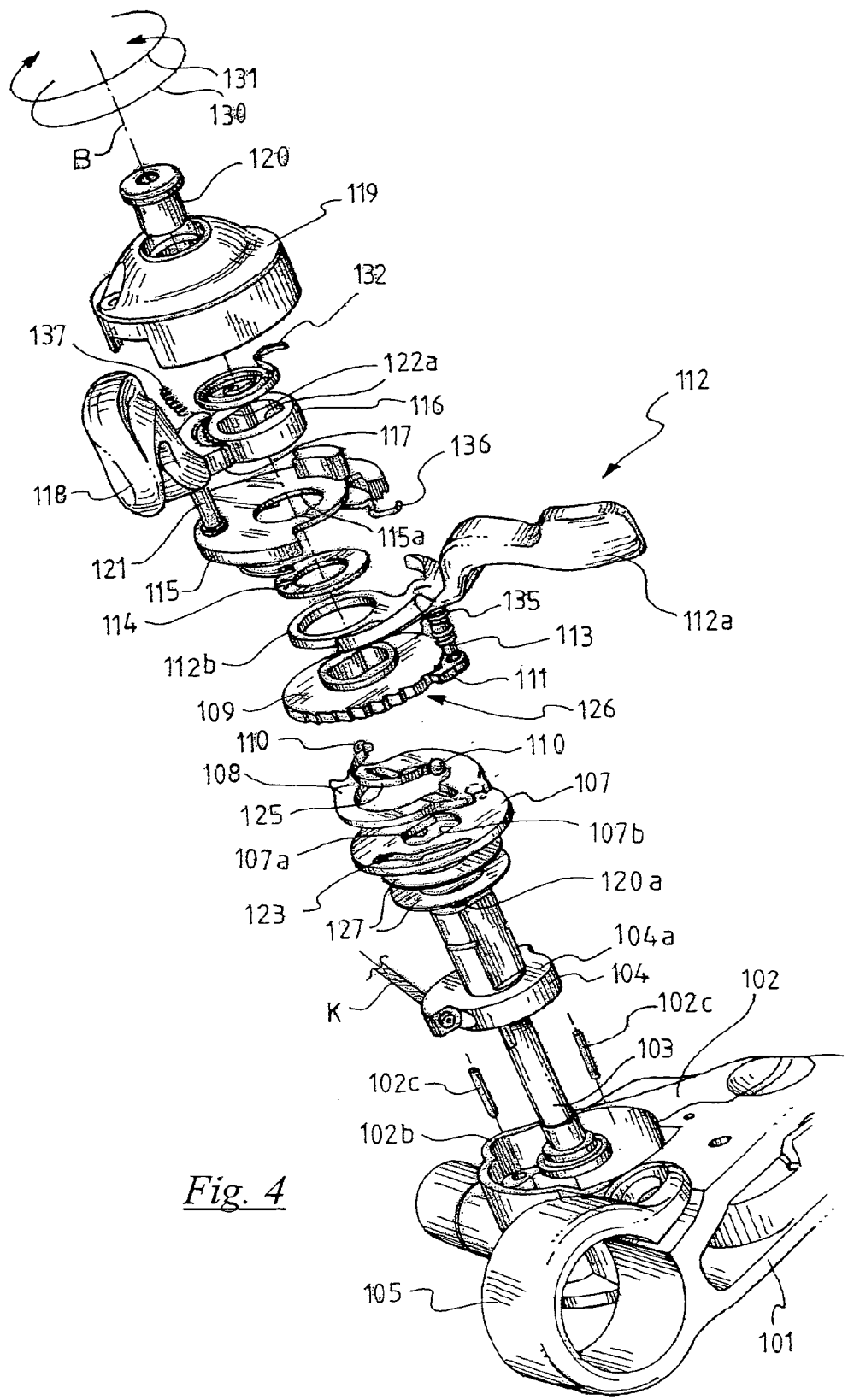
FIG. 4 is an upturned exploded perspective view from below of the device of FIG. 1.
Figure 5:
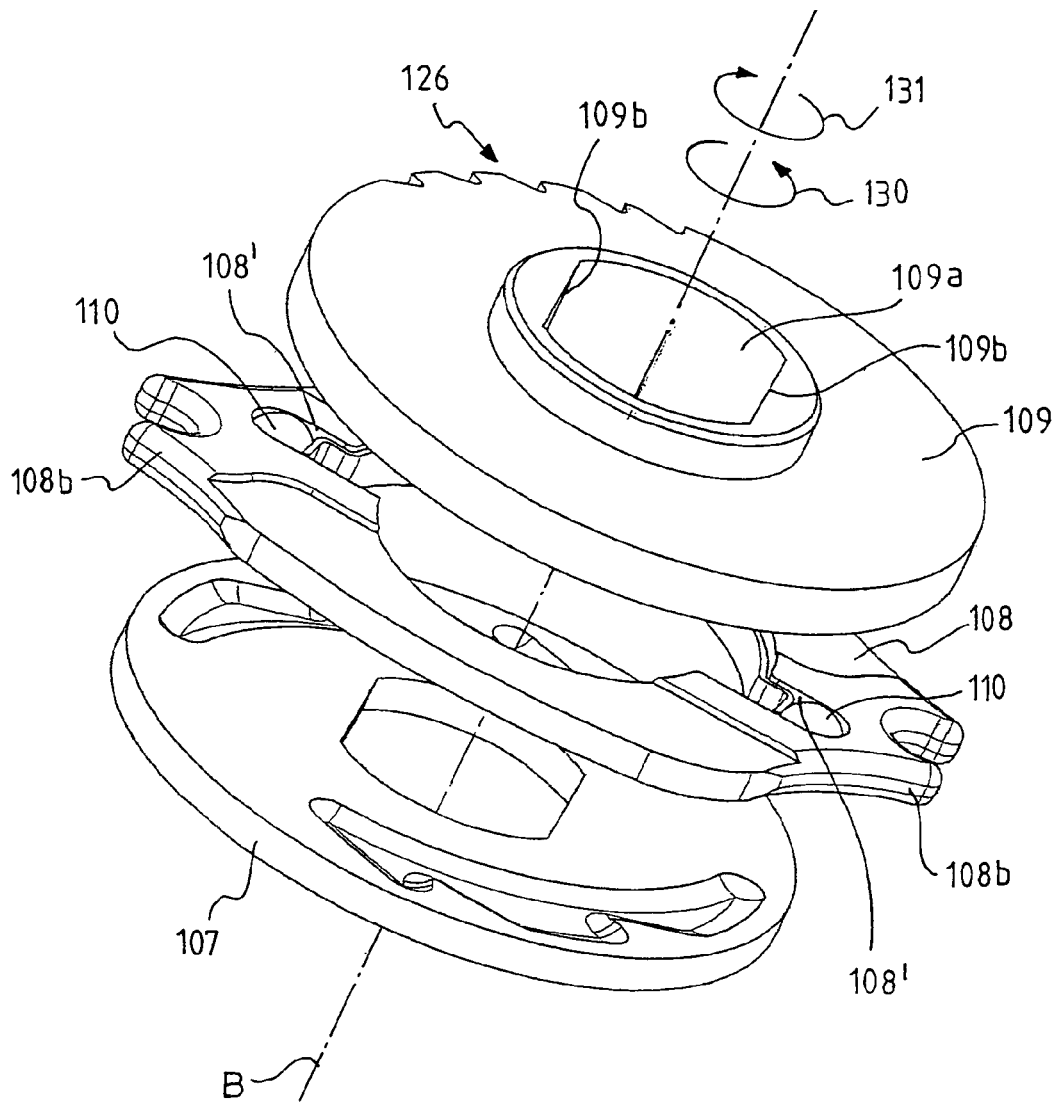
FIG. 5 is a perspective view of some details of the device of FIG. 1.

With particular reference to FIGS. 3 and 4, the device 100 comprises a casing 102, which is fixed to the handlebar M in a conventional manner, for example through a support 101 (which in the illustrated example also carries a brake lever F of a brake control of the bicycle) with a strap 105.

In the casing 102 a central shaft 103 is provided, fixed with respect to the casing 102 and extending along an axis B. The axis B is—as shall become clear hereafter—the main reference axis for the elements that make up the device 100; all of the indications of direction and similar, such as "axial", "radial", "circumferential", "diametral" shall refer to it; equally, the indications "outwards" and "inwards" referring to radial directions must be understood as away from the axis B or towards the axis B. About the axis B, two opposite angular directions are also defined, indicated with 130 and 131, the first in the clockwise direction, the second in the counter-clockwise direction, viewing the device 100 from above; however, it should be noted that in the plan views (FIGS. 2, 6a, 6b) as well as in most of the perspective views (FIGS. 4 and 5) the device 100 is seen from below.

On the shaft 103 a cable-winding drum 104 is mounted free in rotation, to which the cable K to be actuated is fixed and wound. The drum 104 is provided with a shank 106, integral or in any case monolithic therewith, which has a non-circular shape, for example cylindrical with two leveled walls 106a, thus suitable to be used to fit elements that must be integral in rotation with the drum 104.

On the shank 106 a first indexing disc 107 is fitted integral in rotation, provided for this purpose with a central hole 107a with a shape matching the section of the shank 106, i.e. cylindrical in shape with two flat walls 107b. Between the first indexing disc 107 and the drum 104 at least one Belleville spring 127 is arranged (in the illustrated example there are two facing springs 127), compressed in the axial direction.

A ball-carrying disc 108 is also mounted on the shank 106; this disc 108, however, is not fitted integral in rotation on the shank 106 and therefore with the drum 104, but is instead provided with a central hole 108a that does not engage the shank 106. Conversely, the ball-carrying disc 108 is mounted locked in rotation in the casing 102, by two radially projecting opposite tangs 108b, which engage in corresponding seats 102b in the casing 102, on pins 102c fixed to the casing 102.

A second indexing disc 109 is then fitted also on the shank 106, said disc 109—like the disc 107—being provided with a central hole 109a with a shape matching the section of the shank 106, i.e. cylinder-shaped with two flat walls 109b.

The discs 107, 108 and 109, together with the surrounding elements that cooperate with them, such as the springs 127, the seats 102b, the walls 106b, form the indexer for the device 100.

An operating mechanism 112 is also provided for downward gearshifting, with an actuation lever 112a provided with a ring-shaped inner portion 112b fitted rotatably on the shank 106 and held there in the axial sense by an elastic retaining ring 114 (of the type commonly known as seger ring), inserted in a corresponding annular seat 114a formed on the shank 106. The mechanism 112 is a per se conventional ratchet mechanism and comprises a first pawl 111, which is carried by a shaft 113 mounted on the lever 112a and in operation engages a toothed sector 126 of the disc 109; a closing spring 135 cooperates with the pawl 111, pushing it towards a position towards the toothed sector 126, a position in which the pawl 111 does not engage the toothed sector 126 when the lever 112a is in a rest position, whereas it does engage it as soon as the lever 112a is actuated to carry out downward gearshifting. Finally, a return spring 136 for the lever 112a is provided.

Furthermore, an operating mechanism 118 is provided for upward gearshifting, with an actuation lever 118a. The mechanism 118 is also a per se conventional ratchet mechanism and comprises a plate 115 mounted on the shank 106, provided with a central hole 115a sufficiently large as to not interfere with the shank 106 and locked in rotation in the casing 102, thanks to a radially projecting tang 115b, which engages in one of the seats 102b formed inside the casing 102. The plate 115 carries a shaft 121 on which both the lever 118a, and a second pawl 117 are hinged; in operation the pawl 117 engages a toothed drum 116, fitted integral in rotation on the shank 106 of the drum 104 by a central hole 122 with a shape matching the section of the shank 106, i.e. cylinder-shaped with two flat walls 122a; an opening spring 137 cooperates with the pawl 117, pushing it towards a position approaching the toothed drum 116, a position in which the pawl 117 does not engage the toothed drum 116 when the lever 118a is in a rest position, whereas it does engage it as soon as the lever 118a is actuated to carry out upward gearshifting. Finally, a return spring 132 for the lever 118a is provided.

Finally, a cover 119 is mounted also on the shank 106, held by a screw 120 screwed into a corresponding hole 120a, formed axially in the shank 106.

The indexer of the device 100 is described hereafter, with particular reference to FIGS. 5 to 8.

In the ball-carrying disc 108 two radial slots 108' are formed that are closed towards the outside, identical and diametrically opposite, in each of which a respective ball 110 is housed so that it is mobile; the two balls 110 are biased elastically outwards in the slots 108' by a single leaf spring 125, mounted on the disc 108. The slots 108' are open on both sides of the disc 108, which has a smaller thickness than the diameter of the balls 110 that this form pointers projecting in the axial direction from the disc 108, as can clearly be seen in FIGS. 7 and 8.

In the first indexing disc 107 two recesses 123 are formed that are the same and point for point diametrically opposite; two mirroring recesses (again indicated with reference numeral 123) are formed in the second indexing disc 109.

Each recess 123 has a width and depth such as to receive the balls 110, or rather the portion of such balls 110 that projects from the slot 108' of the disc 108, and is arranged according to an outline that comprises three stop zones 124', 124", 124''' alternating with two sliding zones 134' and 134".

Each sliding zone 134' and 134" comprises a first circumferential free sliding section 144' and 144", with circumferential progression with respect to the axis B, and a second inclined sliding section 145' and 145" defining an inclined sliding direction (S) that forms an angle α1 (75°) with respect to the radial direction R.

Thus, the balls 110 are engaged at a first side with a stationary member in the casing 102, formed from the ball-carrying disc 108 with its slots 108', at a second side with a rotary member integral in rotation with the cable-winding drum 104, formed from the indexing discs 107 and 108 with their recesses 123.

The intermediate stop zone 124" is defined by a stop wall 124"a and by a sliding wall 144"a, extending the first along a stop direction (indicated with T in FIG. 6b), the second along a circumferential sliding direction. The stop direction T does not enclose the radial direction R passing through the stop zone 124", and the stop wall 124"a is thus undercut with respect to the radial direction R by an angle α2 (15°).

The recesses 123 are closed at the ends, as well as towards the inside; they are thus delimited by a continuous outer peripheral margin, regularly indented by the presence of the succession of stop zones and sliding zones, and by an analogous inner margin.

The first stop zone 124' is defined by the initial end 123a of the recess 123 and by a sliding wall 144'a.

The last stop zone 124''' is defined by a stop wall 124'''a and by the final end 123b of the recess 123. The stop wall 124'''a is thus undercut with respect to the radial direction R.

The fact that there are three stop zones means (as shall shortly be seen more clearly, when its operation is described) that the illustrated device 100 is intended for a three-gear ratio gearshift. Should it be necessary to operate on a gearshift with a different number of ratios (front gearshift with two or four or more crowns, or else rear gearshift with two or four or more pinions), an equal number of stop zones must be provided. Clearly, there would still be a first and a last stop zone, with a suitable number of intermediate stop zones in between.

The operation of the device 100, with particular reference to its indexer, is the following.

In static conditions of the device, when the cyclist does not act on it, the previously set gear ratio of the gearshift must be maintained (for example the intermediate one), or the cable K must neither be wound onto nor unwound from the drum 104. In other words, the drum 104 must not rotate, even if subjected to the traction exerted on the cable K by the return spring present in the gearshift, which would tend to make the drum 104 rotate in the direction 131, as well as leading to knocks and jolts caused by the movement of the bicycle, which can clearly act in any direction.

This maintenance is obtained by the indexer. The rotation of the drum 104 is prevented by the fact that the balls 110 are, on one side, locked in the slots 108', and thus unable to make any movement other than in the radial direction, and on the other side, engaged in the stop zones 124', 124" and 124''' of the recess 123.

Figure 7:
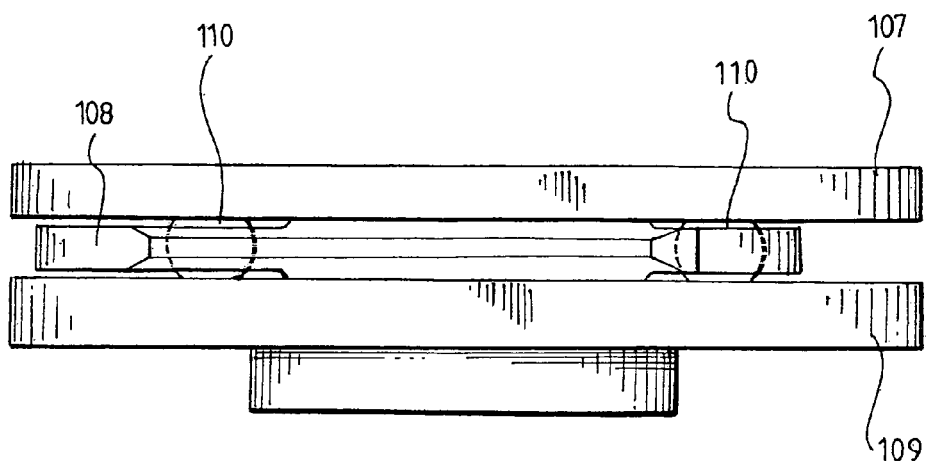
FIG. 7 is a side view of the details of FIG. 5, in an operative state.
Figure 8:
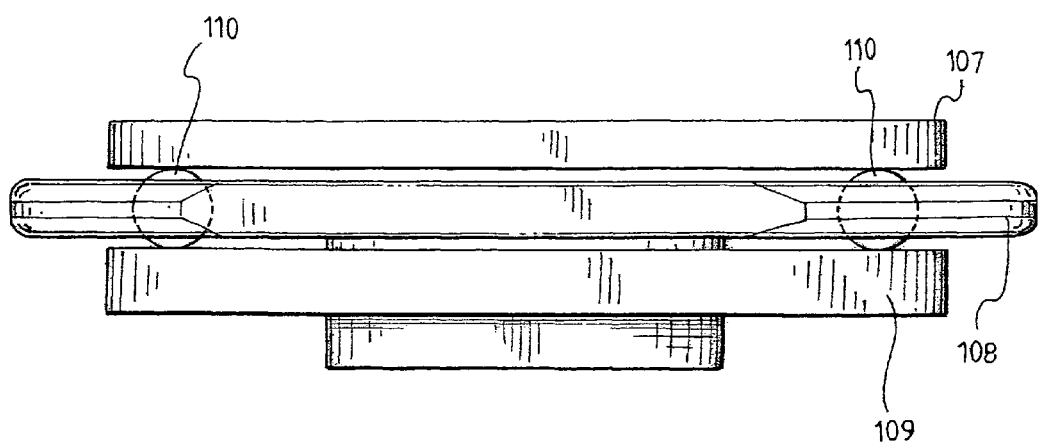
FIG. 8 is a side view analogous to FIG. 7, with the same details in a different operative state.

The traction transmitted by the cable K ensures that every stop wall 124"a pushes in the direction 131 against the ball 110, but the orientation in undercut of such a wall ensures that such a push cannot move the ball 110, locked in the stop zone 124". This condition causes an axial push on the indexing discs 107 and 109 in the sense of their separation, blocked by the springs 127, however; therefore, the springs 127 must be sized in such a way that the axial push exerted by them is sufficient to keep the two indexing discs 107 and 109 from moving apart. This closed condition of the indexing discs 107 and 109 is illustrated in FIG. 7; the position of the balls 110 in the stop zones can thus be defined as stop position, since in such a position the balls make the discs 107, 108 and 109 integral in rotation.

Let us now hypothesize that the cyclist carries out upward gearshifting starting from the intermediate position.

For upward gearshifting, the cyclist acts upon the appropriate lever 118a, pressing it with the thumb of the left hand in the angular direction 130. By doing so, the second pawl 117 engages with the toothed drum 116, pushing it in rotation in the angular direction 130 together with the cable-winding drum 104, with its shank 106 and with all of the elements fitted integral in rotation with it; in particular, the two indexing discs 107 and 109 are rotated in the direction 130.

It should be noted that the first pawl 111 does not prevent the rotation of the disc 109, since—with the lever 112a not actuated—the pawl 111 is disengaged from the toothed sector 126 of the disc 109.

During the first actuation step on the lever 118a, the drum 104 and the indexing discs 107 and 109 are placed in rotation in the angular direction 130 whereas the balls 110 circumferentially cross the first circumferential free sliding section 144". Continuing with the action on the lever 118a, the balls cross the second inclined sliding section 145" and are pushed by the sliding walls 145"a inwards into the slots 108', overcoming the outward radial push of the spring 125. As the action of the cyclist on the lever 118a continues, as the rotation of the drum 104 progressively proceeds, the balls 110 thus cross the entire sliding zone 134", finally reaching the height of the stop zone 124''', where they are positioned also pushed by the spring 125. The balls 110 remain in such a position, as just described, maintaining the new gear ratio even after the cyclist has interrupted his action. The lever 118a, once released, goes back into position thanks to the return spring 132.

Preferably, to make upward gearshifting smooth, the counteraction force exerted by the spring 125 on the two balls 110 is relatively low, with values for example of less than 1/20 the axial pushing force exerted by the springs 127.

In the above example, in which the starting condition was the intermediate gear ratio of a three-gear ratio device, clearly upward gearshifting can only be from such a gear ratio to a different gear ratio (which in the exemplified case of a front gearshift shall be a higher gear ratio) immediately next to it.

On the other hand, in the case in which the starting condition allows it (for example, in the three-gear ratio device 100 considered, when starting from the lowest gear ratio), the action of the cyclist can be applied until double or multiple gearshifting is obtained. In this case, the cyclist will notice when the first adjacent gear ratio has been reached as a momentary reduction in the force required for gearshifting, due to the fact that at the time of displacement of the balls 110 from the sliding zone 134' to the stop zone 124" the spring 125 operates not against but helping the cyclist, pushing the balls 110 radially outwards; at such a time, the cyclist can decide to keep such a gear ratio and thus interrupt his action releasing the lever 118a, or continue his action until a subsequent gear ratio has been obtained.

Figure 6A:
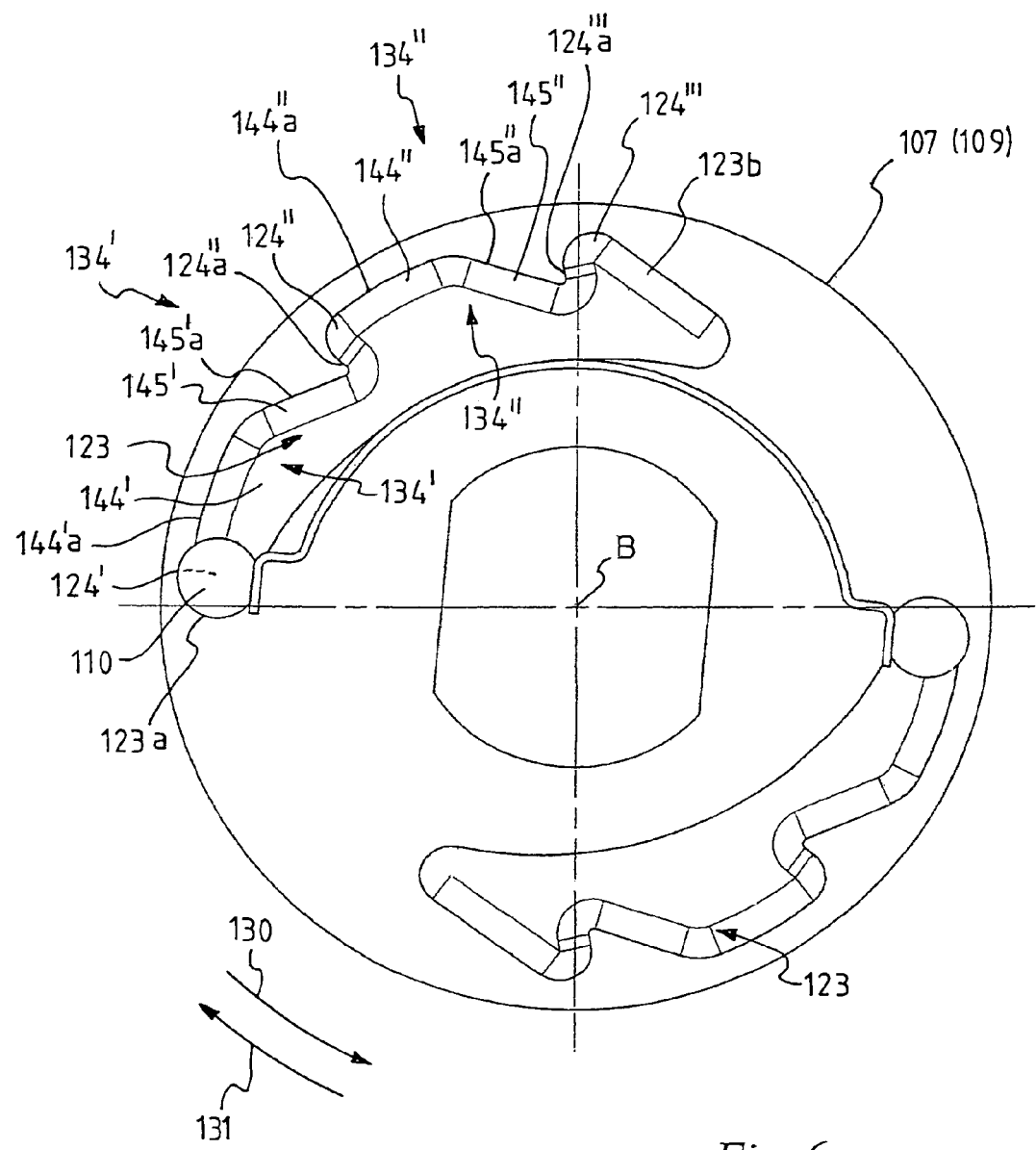
FIG. 6a is a plan view of some details of the device of FIG. 1.
Figure 6B:
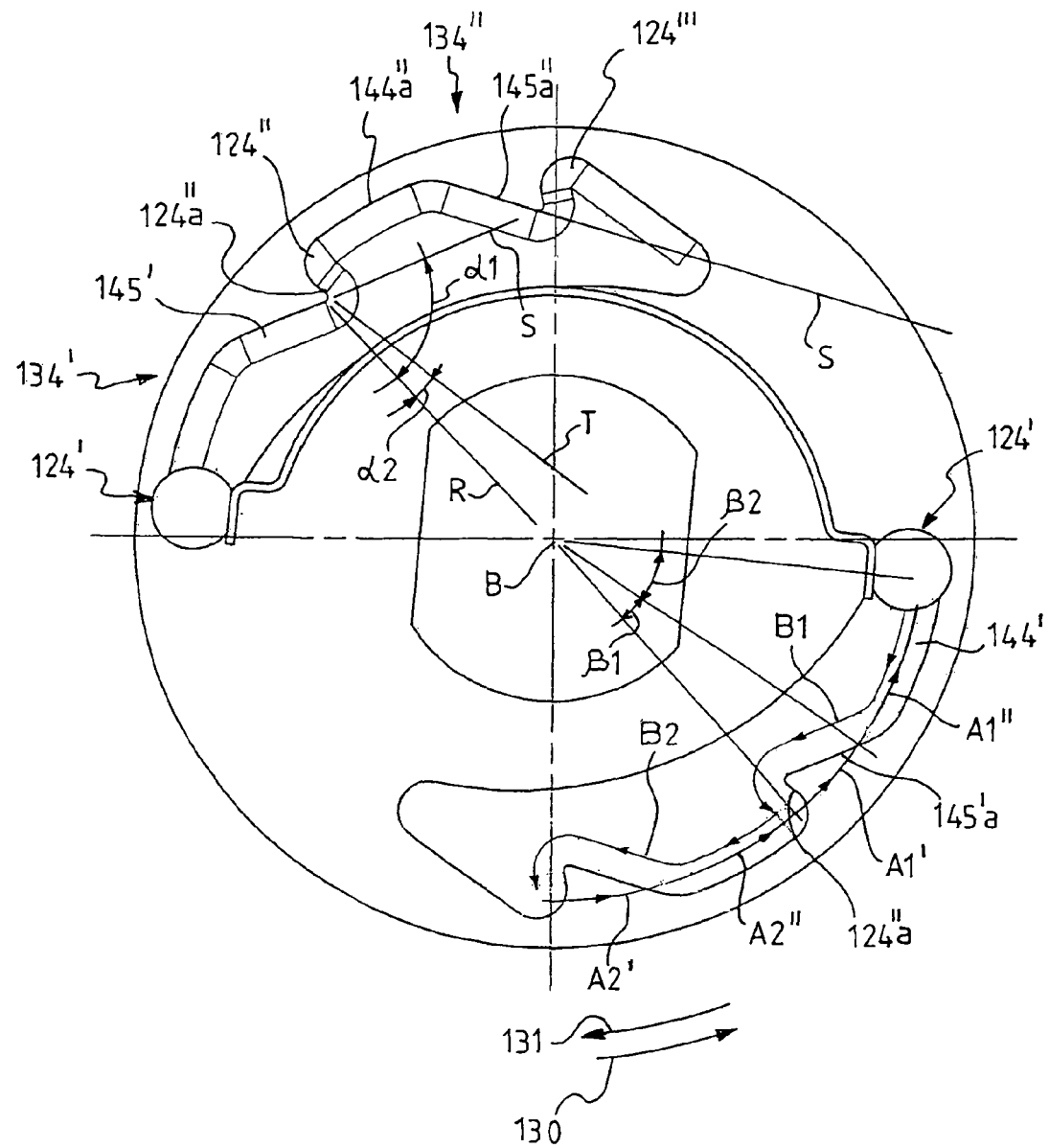
FIG. 6b is a plan view analogous to FIG. 6a, with some further details of the device of FIG. 1 highlighted.

In FIG. 6b, B1 and B2 indicate the relative paths of one of the balls 110 in the recess 123, during upward gearshifting from the low gear ratio to the intermediate (B1) and from the intermediate to the high gear ratio (B2).

For downward gearshifting, for example starting from the intermediate gear ratio, the cyclist acts, on lever 112a, pulling it with his or her index finger in the angular direction 131. By doing so, the first pawl 111 engages with the toothed sector 126 of the indexing disc 109, pushing the drum 104 in rotation in the angular direction 131 together with its shank 106 and all of the elements fitted integral in rotation with it; in particular, the indexing disc 107 and the toothed drum 116 are also rotated in the direction 131.

Firstly, it should be noted that the second pawl 117 does not prevent the rotation of the toothed drum 116, since the lever 118a is not actuated, the pawl 117 is disengaged from the toothed drum 116.

During this action of the cyclist, the balls 110 cannot go back along the path B1 in the recess 123, due to the undercut stop walls 124"a of the stop zones 124". In the first actuation step of the downshift lever 112a by the cyclist, i.e. the rotation of the lever 112a in the angular direction 131, the balls 110 push on the stop walls 124"a causing an axial push on the indexing discs 107 and 109 in that they move away from each other, in contrast to the springs 127. If the cyclist exerts sufficient traction to overcome the contrasting action of the axial springs 127, the indexing discs 107 and 109 go from the closed condition of FIG. 7 to the open condition of FIG. 8. In the open condition, the combined counteraction force exerted by the springs 127 on the discs 107 and 109; and the friction between the balls 110 and the two discs 107 and 109 is sufficient to prevent the rotation of the balls 110. It should be noted that this friction, despite the fact that balls are used, is substantially sliding and not rolling friction, since the coupling of each ball on the disc 107 is opposite that on the disc 109, so that the rotation of the balls 110 is actually prevented. The coefficient of friction can be suitably selected by means of the sizing of the springs 127 that determine the force with which the discs 107 and 109 are pressed axially towards each other; thus, it is possible in particular to ensure that such a friction force balances and overcomes the return force exerted by the spring of the gearshift through the cable K. To allow the further rotation of the cable-winding drum 104 in the condition of discs open it is necessary, therefore, for the cyclist to actively act pulling on the downshift lever 112a, which thereby acts on the indexing discs 107 and 109, so that the balls 110 cross section A1' defined between the stop wall 124"a and the sliding wall 145"a of the second inclined sliding section 145". During such an active pulling step by the cyclist the balls 110 cross a first active section having extension β1 (14°). As soon as the balls 110 reach the circumferential free sliding section 144', the two discs 107, 109 return to the closed condition of FIG. 7 and the drum 104 and the indexing discs 107, 109 rotate freely, subjected to the traction force on the cable K exerted by the return spring of the derailleur. The free rotation takes place for an angular extension β2 (26°) until the balls 110, crossing section A1", reach the stop zone 124'. The balls 110 remain in such a position, as just described, maintaining the new gear ratio even after the cyclist has interrupted his action. The free rotation step of angular extension β2 of the two indexing discs 107, 109 takes place independently of the type of action of the cyclist on the downshift lever 112a. In particular, the downshift lever 112a can be released as soon as the balls 110 have crossed the first active section having extension β1. The downshift lever 112a, once released, returns into position by the return spring 136.

The described indexing mechanism therefore allows there to be an active pushing step corresponding to a percentage equal to $\beta1/(\beta1+\beta2)$ (35%) with respect to the entire pulling step of known active mechanisms.

The values of β1 and β2 of the above example are linked to the inclination α1 of the second inclined sliding section 145' and 145". The inclination α1 is selected based upon the outward radial pushing force of the springs 125 that must be overcome during upward gearshifting (for the above example the radial pushing force of each spring 125 on the respective ball 110 is about 2N). In the case of use of different springs 125 with different radial pushing forces, the inclination α1 of the second inclined sliding section shall be different. More specifically, the greater the radial push of the springs 125 the greater the inclination α1 of the second inclined sliding section shall be.

Extreme values for β1, β2 and α1 can be selected equal to β1=β2=20° and α1=88° corresponding to an active push percentage of 50% with respect to known active mechanisms.

Also in downward gearshifting, in the same way as what has been seen for upward gearshifting, multiple gearshifting is possible.

In such a case, with reference to FIG. 6b, it shall be possible to carry out double gearshifting starting from the initial condition with the balls 110 in the third stop zone 124''' up to the final condition with the balls 110 in the first stop zone 124'.

Double gearshifting provides a first active step by the cyclist to make the balls cross the section A2', by being pushed. Then follows a free rotation step along section A2", at the end of which the balls 110 reach the stop zone 124". Unlike the single gearshifting described above, during the rotation of the balls 110 along section A2" the cyclist does not release the downshift lever 112a, but continues in a rotation step following the rotation of the drum 104 and of the indexing disc 109 on the outer surface of which it is engaged through the pawl 111. The further rotation of the downshift lever 112a gives rise to a second single gearshifting with a first active step by the cyclist to make the balls 110 cross section A1', being pushed, followed by a free rotation step along section A1", at the end of which the balls 110 reach the final stop zone 124'. The downshift lever 112a can be released as soon as the balls have crossed the first active section A1' and return to a rest position by the return spring 136.

Basically, at each recess 123 a hooking path is thus defined for the pointer comprising each ball 110, with stop positions at the stop zones 124', 124" and 124''', interspaced by free sliding paths formed from the sections A1" and A2", at the circumferential free sliding sections 144', 144", and from active sliding paths formed from the sections A1' and A2', near the recess 123.

Figure 9:
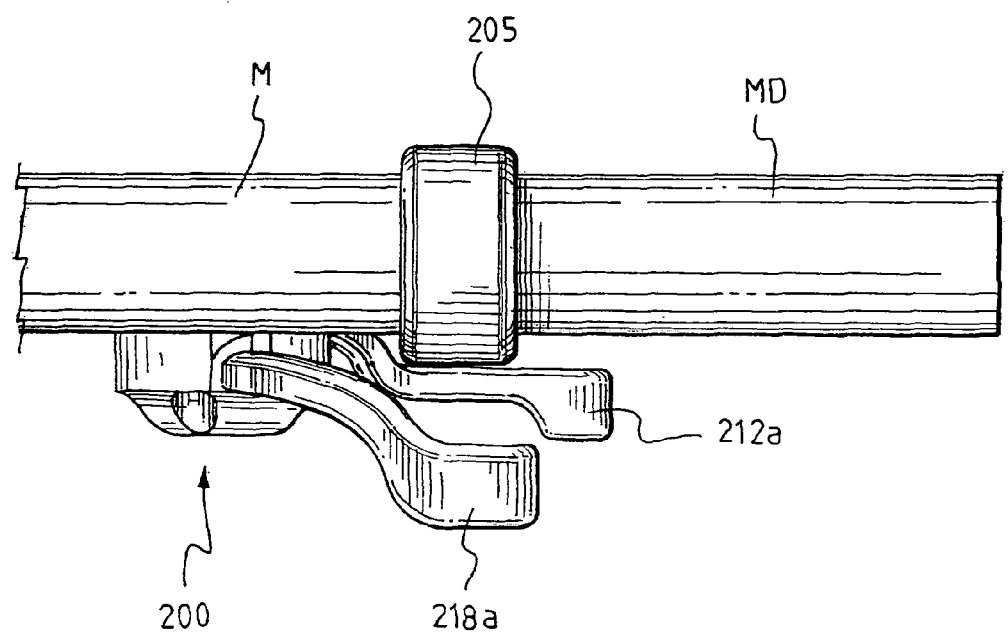
FIG. 9 is a view of an actuation device of the control cable of a rear gearshift (right-hand device), mounted on straight handlebars, from the cyclist's point of view.
Figure 10:
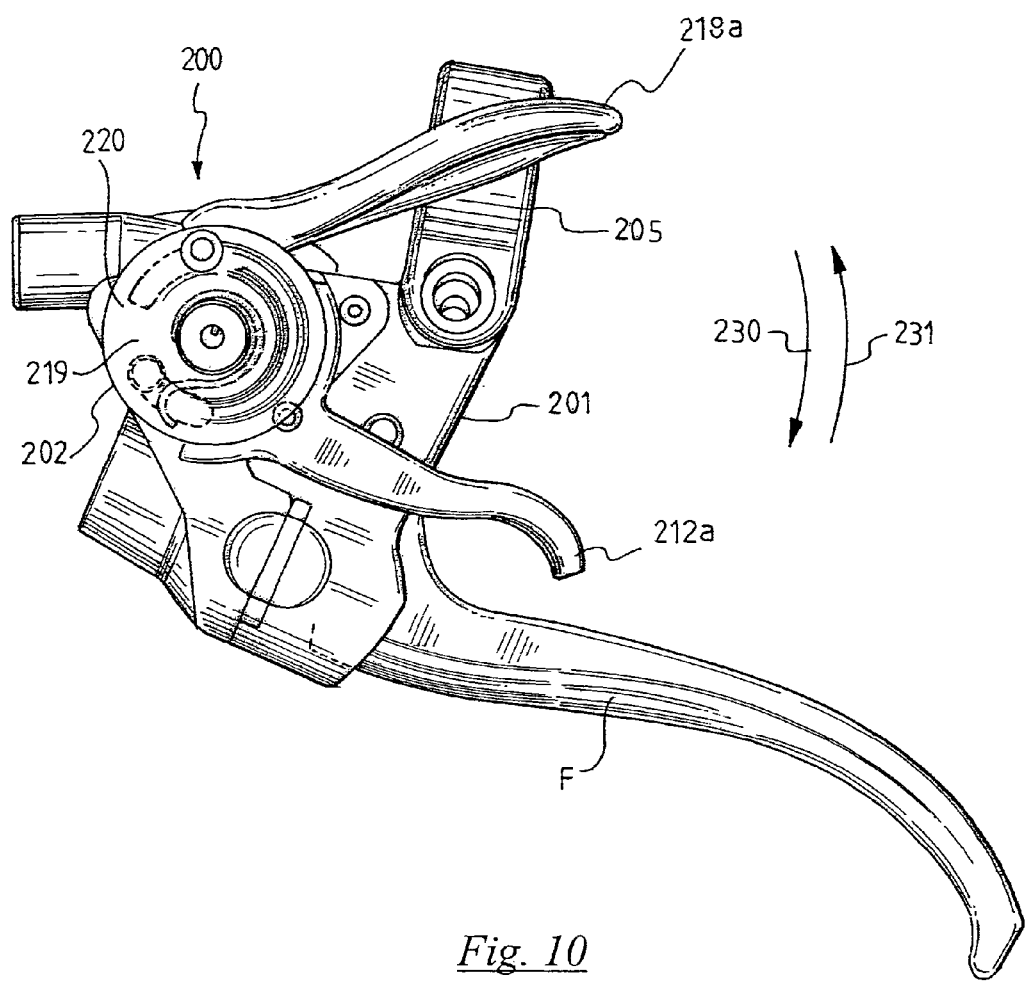
FIG. 10 is a view from below of the device of FIG. 9, without handlebars.
Figure 11:
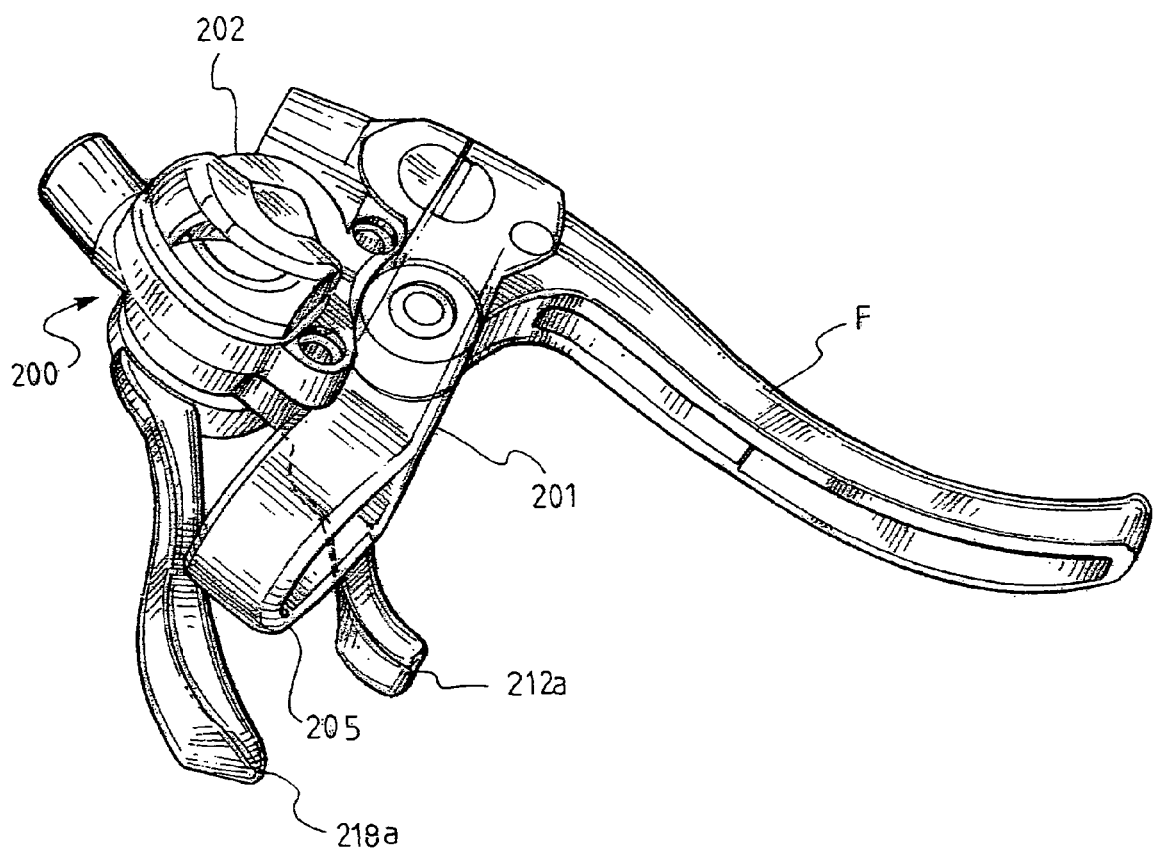
FIG. 11 is a perspective view from above of the device of FIG. 9, shown without handlebars.

FIG. 9 to 16 show, as a second embodiment of the invention, an actuation device 200 of the control cable K of a rear gearshift or derailleur (not shown). With particular reference to FIG. 9, the device 200 is mounted near the right-hand grip MD of the bicycle handlebar M; the handlebar M shown is also in this case a straight handlebar, normally used for mountain bikes. As stated for the device 100, obviously, the embodiment of the invention of the device 200 is also not limited to application to such handlebars, nor to application on the right-hand side thereof.

Figure 12:
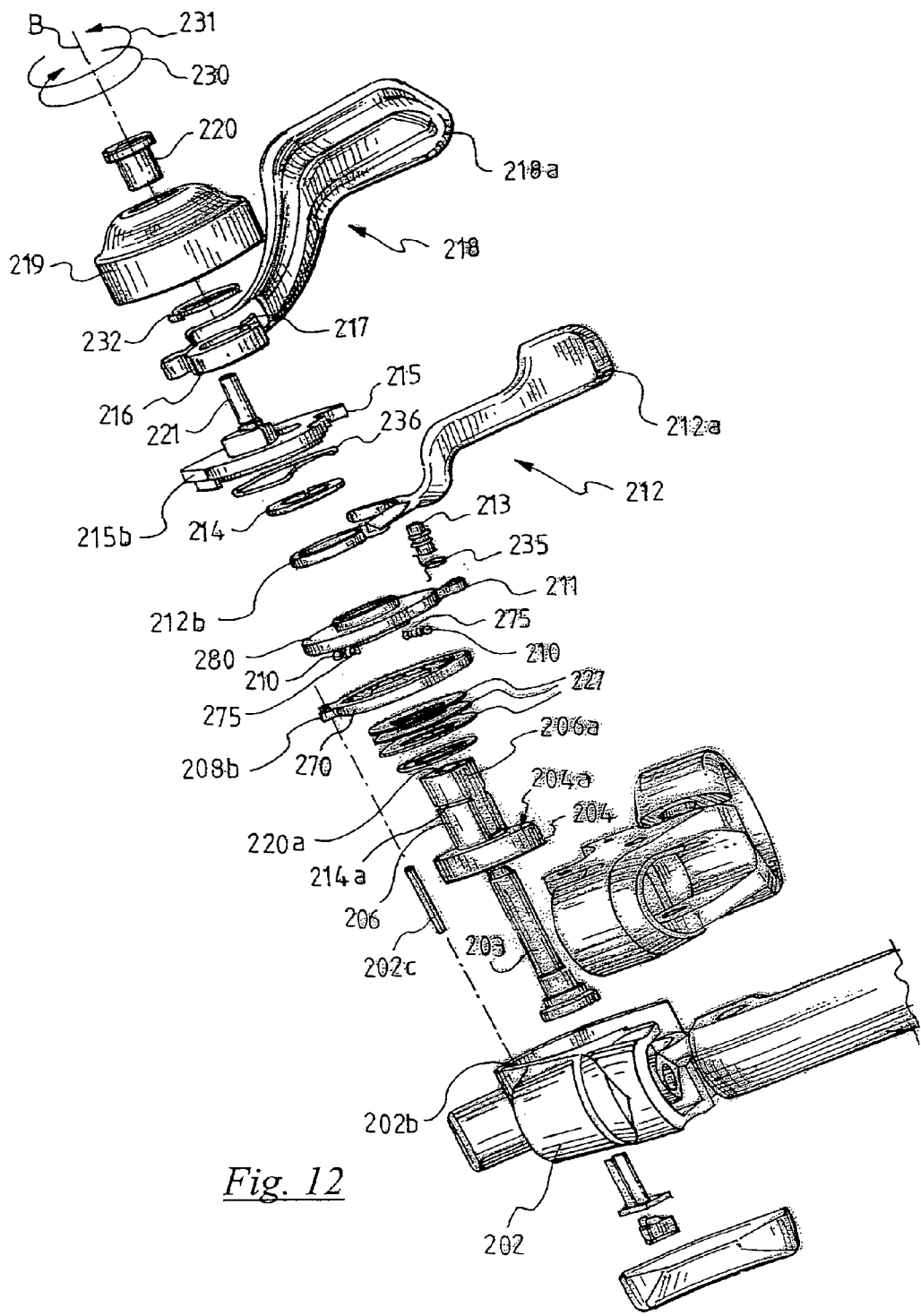
FIG. 12 is an upturned exploded side perspective view of the device of FIG. 9.

With particular reference to FIG. 12, the device 200 comprises a casing 202, which is fixed to the handlebar M in a conventional manner, for example through a support 201 (which in the illustrated example also carries a brake lever F) with a strap 205.

In the casing 202 a central shaft 203 is provided, fixed with respect to the casing 202 and extending along an axis B. The axis B is—like in the case of the embodiment of the device 100—the main reference axis for the elements that form part of the device 200; all of the indications of direction and similar, such as "axial", "radial", "circumferential", "diametral" shall refer to it; equally, the indications "outwards" and "inwards" referring to radial directions should be understood as away from the axis B or towards the axis B. About the axis B, two opposite angular directions are also defined, indicated by 230 and 231, the first in the counter-clockwise direction, the second in the clockwise direction, viewing the device 200 from above; however, it should be noted that in the plan views (FIGS. 10 and 14 to 16) as well as in most of the perspective views (FIG. 12, 13) the device 200 is seen from below.

A cable-winding drum 204, to which the cable K to be actuated is fixed and wound is mounted on the shaft 203 free in rotation. The drum 204 is provided with a shank 206, made integral or in any case monolithic thereto, which has a non-circular shape, for example cylindrical with two leveled walls 206a, enabling it to fit elements thereon that must be integral in rotation with the drum 204.

A first indexing disc 270 is mounted on the shank 206; this first disc 270 is not fitted integral in rotation on the shank 206 and therefore also not integral in rotation with the drum 204, but instead is provided with a large central hole 208a that does not interfere with the shank 206. Conversely, the indexing disc 270 is mounted locked in rotation in the casing 202, thanks to a radially projecting opposite tang 208b, which engages in a corresponding seat 202a in the casing 202, on a pin 202c fixed to the casing 202. At least one Belleville spring 227 is arranged between the first indexing disc 270 and the drum 204 (in the illustrated example there are three interfacing springs 227), compressed in the axial direction.

Again on the shank 206 a ball-carrying disc 280 is also fitted integral in rotation, provided for the purpose with a central hole 280a with a shape matching the section of the shank 206, i.e. cylinder-shaped with two flat walls 280b.

The discs 270 and 280, together with the surrounding elements that cooperate with them, like for example the springs 227, the seat 202b, the walls 280b, form an indexer for the device 200.

An operating mechanism 212 is also provided for downward gearshifting, with an actuation lever 212a provided with a ring-shaped inner portion 212b fitted rotatably on the shank 206 and held there in the axial direction by an elastic retaining ring 214 (of the type commonly known as seger ring), inserted in a corresponding annular seat 214a formed on the shank 206. The mechanism 212 is a per se conventional ratchet mechanism and comprises a first pawl 211, which is carried by a shaft 213 mounted on the lever 212a and engages in operation with a toothed sector 276 of the disc ball-carrying disc 280; a closing spring 235 cooperates with the pawl 211, pushing it towards a position approaching the toothed sector 276, a position in which the pawl 211 does not engage the toothed sector 276 when the lever 212a is in a rest position, whereas it does engage it as soon as the lever 212a is actuated to carry out downward gearshifting. Finally, a return spring 236 for the lever 212a is provided.

Furthermore, an operating mechanism 218 is provided for upward gearshifting, with an actuation lever 218a. The mechanism 218 is also a per se conventional ratchet mechanism and comprises a plate 215 mounted on the shank 206, provided with a central hole 215a sufficiently large as to not interfere with the shank 206 and locked in rotation in the casing 202, thanks to a radially projecting tang 215b, which engages in the seat 202b formed inside the casing 202. The plate 215 carries a shaft 221 on which both the lever 218a, and a second pawl 217 are hinged; in operation the pawl 217 engages with a toothed drum 216, fitted integral in rotation on the shank 206 of the drum 204 by a central hole 222 with a shape matching the section of the shank 206, i.e. cylinder-shaped with two flat walls 222a; an opening spring 237 (not visible in the figures) cooperates with the pawl 217, pushing it towards a position approaching the toothed drum 216, a position in which the pawl 217 does not engage the toothed drum 216 when the lever 218a is in a rest position, whereas it does engage it as soon as the lever 218a is actuated to carry out upward gearshifting. Finally, a return spring 232 for the lever 218a is provided.

Finally, again on the shank 206, a cover 219 is mounted, held by a screw 220 screwed into a corresponding hole 220a, formed axially in the shank 206.

Figure 13:
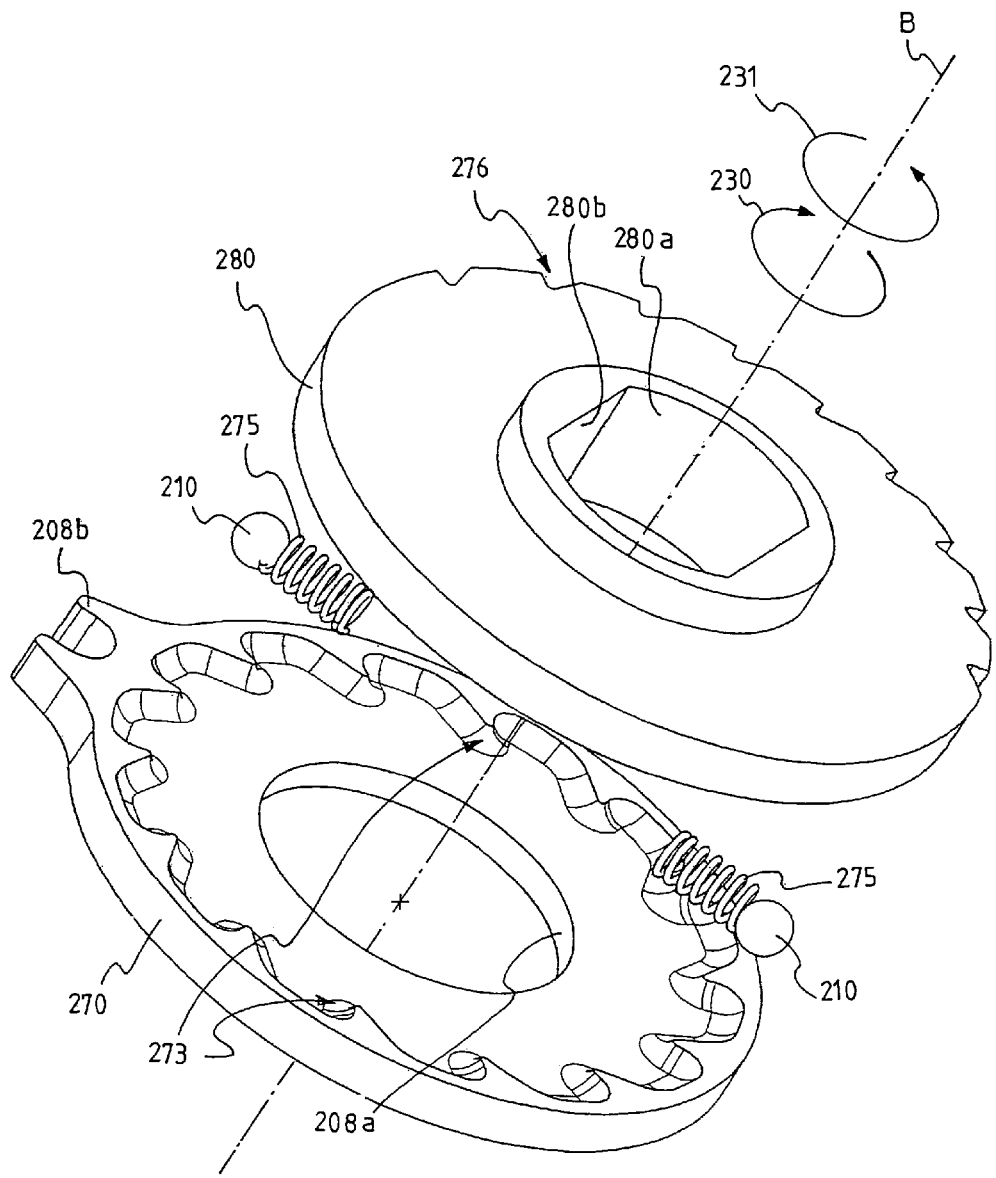
FIG. 13 is a perspective view of some details of the device of FIG. 9.
Figure 14:
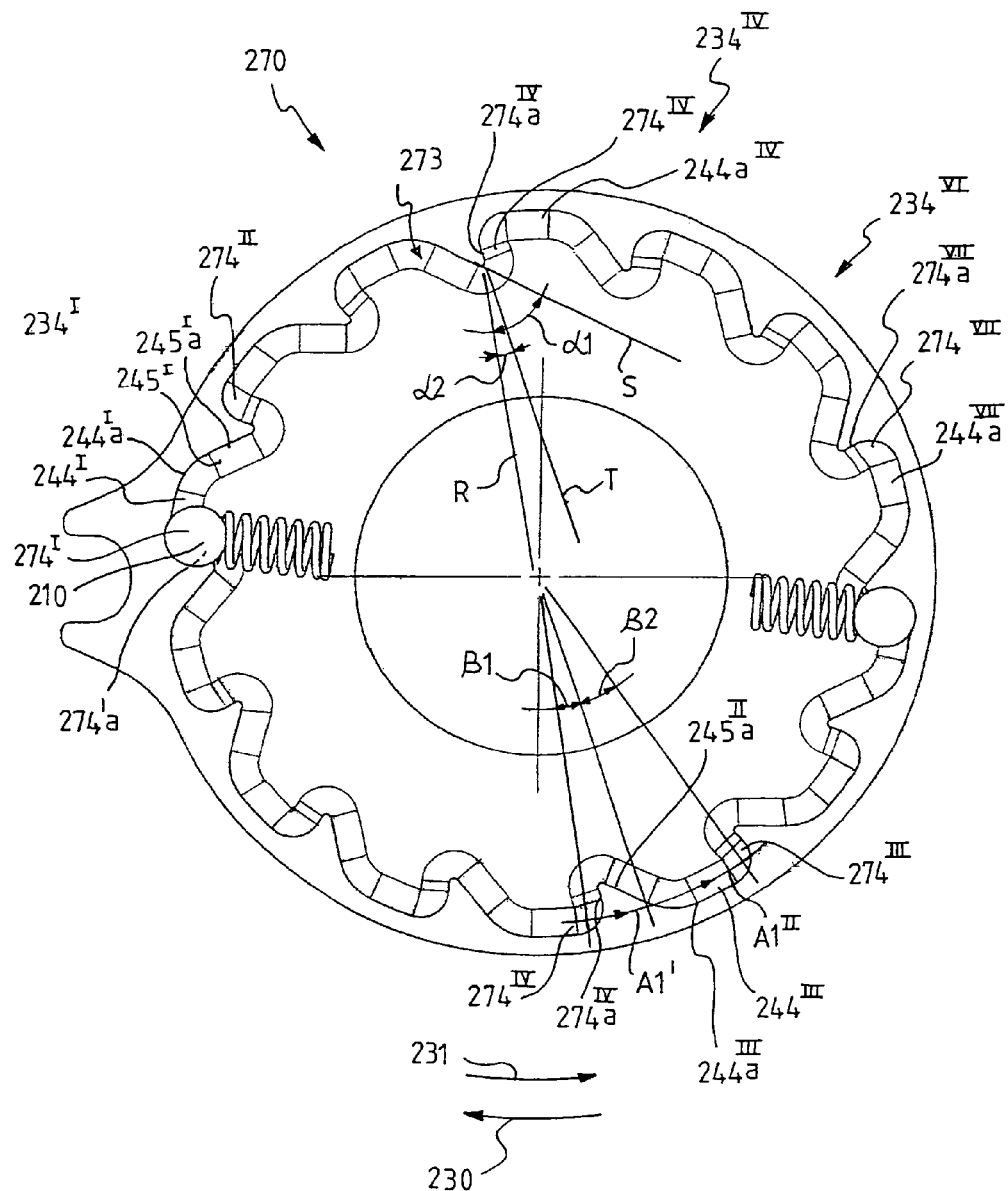
FIG. 14 is a plan view of some details of the device of FIG. 9.
Figure 15:
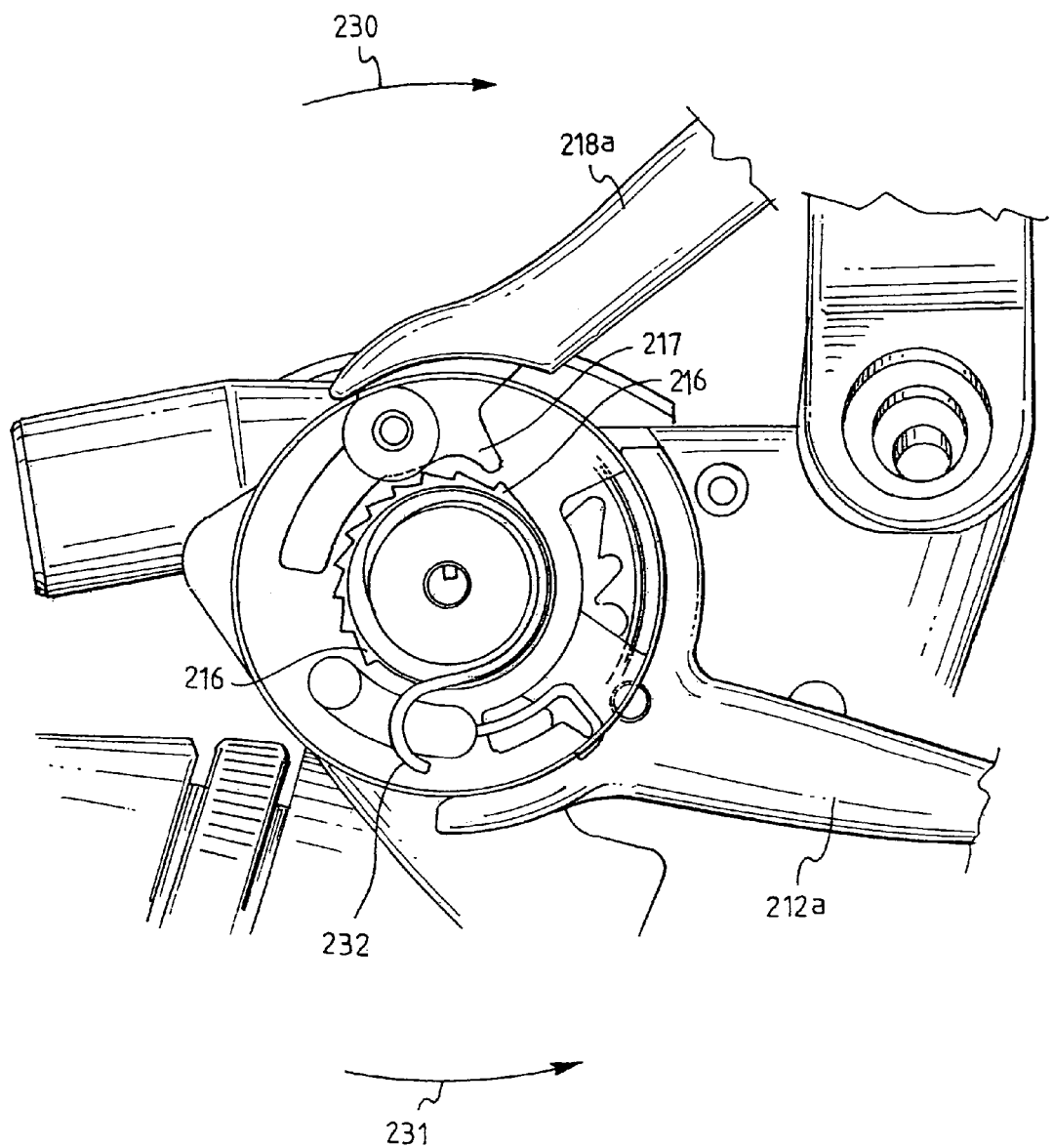
FIG. 15 is a plan view from below, with parts partially removed and sectioned, of some details of the device of FIG. 9, with the upshift lever in rest position.
Figure 16:
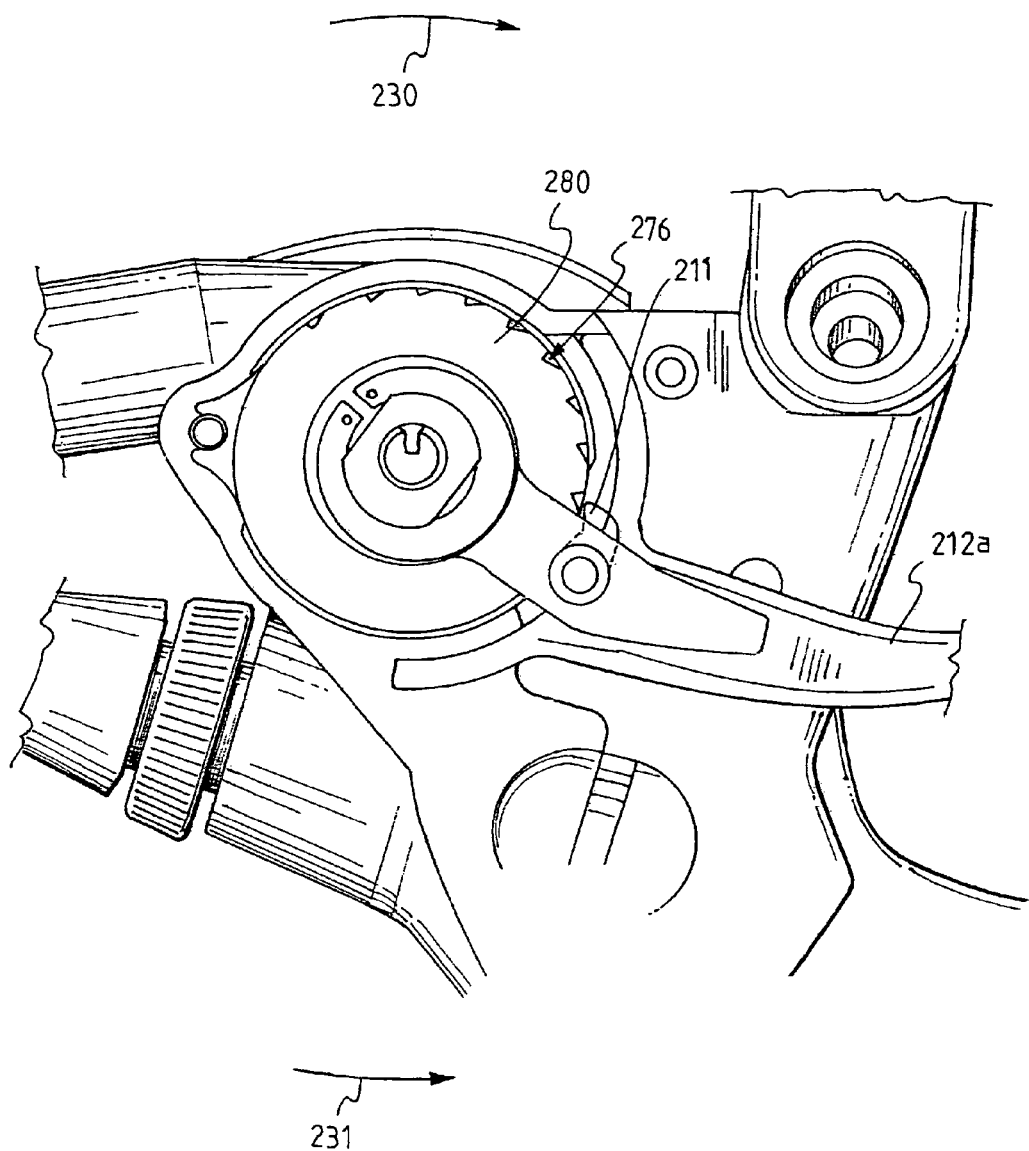
FIG. 16 is a plan view from below, with parts partially removed and sectioned, of some details of the device of FIG. 9, with the downshift lever in rest position.

The indexer of the device 200 is described hereafter, with particular reference to FIGS. 13 and 14.

In the ball-carrying disc 280 two radial slots 280' are formed that are closed towards the outside and towards the inside, identical and diametrically opposite, in each of which a respective ball 210 is housed so that it is mobile; the two balls 210 are biased elastically outwards in the slots 280' by respective helical springs 275, mounted on the disc 280 in the slots 280' themselves. The slots 280' are open on one side of the disc 280 facing towards the indexing disc 270, and have less depth than the diameter of the balls 210 that thus form pointers projecting from the disc 280 in the axial direction.

In the indexing disc 270 two recesses 273 are formed that are the same and point for point diametrically opposite; the two recesses each extend for a little less than 180°, and thus appear joined together.

Each recess 273 has a depth such as to receive the balls 210, or rather the portion of such balls 210 that project from the slot 280' of the disc 280, and is arranged according to an outline that comprises seven stop zones $274^I$-$274^{VII}$ alternated with six sliding zones $234^I$-$234^{VI}$.

Each sliding zones $234^I$-$234^{VI}$ comprises a first circumferential free sliding section $244^I$-$244^{VI}$, with circumferential progression about the axis B, and a second inclined sliding section $245^I$-$245^{VI}$ defining an inclined sliding direction (S) that forms an angle α1 (58°) with respect to the radial direction R.

Thus, the balls 210 are engaged at a first side with a stationary member in the casing 202, formed from the first indexing disc 270 with its recesses 273, at a second side with a rotary member integral in rotation with the cable-winding drum 204, formed from the ball-carrying disc 280 with its slots 280'.

An intermediate stop zone, for example the zone $274^{IV}$ (but the same goes for all of the zones from $274^{II}$ to $274^{VI}$), is defined by a stop wall $274^{IV}$ and by a sliding wall $244^{IV}a$, extending the first along a stop direction (indicated with T), the second along a circumferential sliding direction. The stop direction T does not enclose the radial direction R passing through the stop zone $274^{IV}$ and the stop wall $274^{IV}$ is thus undercut with respect to the radial direction R by an angle α2 (15°).

The recesses 273 are not closed at the ends, nor towards the inside; they thus form a continuous outer peripheral margin, regularly indented by the presence of the succession of stop zones and sliding zones, without an analogous inner margin.

The first stop zone $274^I$ is defined like the others by a stop wall $274^I a$ and by a sliding wall $244^I a$.

In the same way, the last stop zone $274^{VII}$ is defined by a stop wall $274^{VII} a$ and by a sliding wall $244^{VII} a$.

The fact that there are seven stop zones means that the illustrated device 200 is intended for a seven-gear ratio gearshift, clearly a rear gearshift. Should it be necessary to operate on a gearshift with a different number of ratios, an equal number of stop zones must be provided. Clearly, there would still be a first and a last stop zone, with a suitable number of intermediate stop zones in between.

The operation of the device 200, with particular reference to its indexer, is described below.

In static conditions of the device, when the cyclist does not act on it, the previously set gear ratio of the gearshift must be maintained, i.e., the cable K must neither be wound onto nor unwound from the drum 204. In other words, the drum 204 must not rotate, even if subjected to the traction exerted on the cable K by the return spring present in the gearshift, which would tend to make the drum 204 rotate in direction 231, as well as knocks and jolts caused by the movement of the bicycle, which can clearly act in any direction.

This is obtained by the indexer. The rotation of the drum 204 is prevented by the fact that the balls 210 are on one side locked in the slots 280', and at the other side engaged in the stop zones $274^I$-$274^{VII}$ of the recess 273.

The traction transmitted by the cable K ensures that each ball 210 pushes against the stop wall $274^I a$-$274^{VII} a$ in direction 231, but the undercut orientation of such a wall $274^I a$-$274^{VII} a$ ensures that such a push cannot move the ball 210, locked in the stop zone $274^I$-$274^{VII}$. This condition causes an axial push on the indexing discs 270 and ball-carriers 280 are kept from separating by the action of springs 227, therefore, the springs 227 must be sized in such a way that the axial push exerted by them is sufficient to keep the two discs 270 and 280 from moving apart. This closed condition of the indexing discs 107 and 109 is illustrated in FIG. 7. The position of the balls 210 in the stop zones can thus be defined as stop position, since in such a position the balls make the discs 270 and 280 integral in rotation.

Let us now discuss the situation when the cyclist carries out upward gearshifting (i.e. towards a lower gear ratio, concerning the control of a rear gearshift).

For upward gearshifting, the cyclist acts upon the appropriate lever 218a, pressing it with the thumb of the right hand in the angular direction 230. By doing so, the second pawl 217 engages with the toothed drum 216, pushing it in rotation in the angular direction 230 together with the cable-winding drum 204, with its shank 206 and with all of the elements fitted integral in rotation with it; in particular, the ball-carrying disc 280 is rotated in direction 230.

It should firstly be noted that the first pawl 211 does not prevent the rotation of the disc 280, since lever 212a is not actuated—the pawl 211 is disengaged from the toothed sector 276 of the disc 280.

During the first actuation step on the lever 218a, the drum 204 and the ball-carrying disc 280 are placed in rotation in the angular direction 230 whereas the balls 210 circumferentially cross the first circumferential free sliding section $244^I$-$244^{VI}$. Continuing with the action on the lever 318a, the balls cross the second inclined sliding section $245^I$-$245^{VI}$ and are pushed by the sliding walls $245^I a$-$245^{VI} a$ inwards into the slots 280', overcoming the outward radial push of the springs 275. As the action of the cyclist on the lever 218a continues, the rotation of the drum 204 progressively proceeds, the balls 210 thus cross the entire sliding section $245^I$-$245^{VI}$, finally reaching the stop zone $274^{II}$-$274^{VII}$, where they are positioned also pushed by the springs 275. The balls 210 remain in such a position, as just described, maintaining the new gear ratio also after the cyclist has interrupted his action. The lever 218a, once released, returns into position by the return spring 232.

Preferably, to make upward gearshifting smooth, the counteraction force exerted by the springs 275 on the two balls 210 is relatively low, with values of, for example, less than ⅟₂₀ the axial pushing force exerted by the springs 227.

In the case in which the starting position allows it, the action of the cyclist can be applied until multiple gearshifting is obtained. In this case, the cyclist will notice when the first adjacent gear ratio has been reached as a momentary reduction in the force required for gearshifting, due to the fact that at the time of displacement of the balls 210 in sliding zones $234^I$-$234^{VI}$ to the stop zone $274^{II}$-$274^{VII}$ the springs 275 operate not against but rather assist the cyclist, pushing the balls 210 radially outwards; at such a time, the cyclist can decide to keep such a gear ratio and thus interrupt his action releasing the lever 218a, or continue his action until a subsequent gear ratio has been obtained.

For downward gearshifting, the cyclist acts, instead, on lever 212a, pulling it with his or her index finger in the angular direction 231. By doing so, the first pawl 211 engages with the toothed sector 276 of the ball-carrying disc 280, pushing the drum 204 in rotation in angular direction 231 together with its shank 206 and with all of the elements fitted integral in rotation with it; in particular, the toothed drum 216 is rotated in the direction 231.

Firstly, it should be noted that the second pawl 217 does not prevent the rotation of the toothed drum 216, since lever 218a is not actuated, the pawl 217 is disengaged from the toothed drum 216.

During this action of the cyclist, the balls 210 push on the stop walls $274^I a$-$274^{VII} a$ causing an axial push on the indexing discs 270 and ball-carriers 280 causing them to separate, against the action of springs 227. If the cyclist exerts sufficient traction to overcome the contrasting action of the axial springs 227, the discs 270 and 280 go from the closed condition to the open condition. The further rotation of the cable-winding drum 204, like for the case previously described, is obtained through the active pulling on the downshift lever 212a so that the balls 210 cross the section A1' defined between the stop wall $274^{II} a$-$274^{VII} a$ and the sliding wall $245^I a$-$245^{VI} a$ of the second inclined sliding section $245^I$-$245^{VI}$. During such an active pulling step by the cyclist the balls 210 cross a first active section of angular extension β1 (9.8°). As soon as the balls 210 reach the circumferential free sliding section $244^I$-$244^{VI}$, the two discs return to the closed condition of FIG. 7 and the drum 204 together with the ball-carrying disc 280 rotate freely, subjected to the traction force on the cable K exerted by the return spring of the derailleur. The free rotation takes place for an angular extension β2 (16°) until the balls 210, crossing the section A1", reach the stop zone $274^I$-$274^{VI}$. The balls 210 remain in such a position, as just described, maintaining the new gear ratio even after the cyclist has interrupted his action. The free rotation step of angular extension β2 takes place independently of the type of action of the cyclist on the downshift lever 212a. In particular, the downshift lever 212a can be released as soon as the balls 210 have crossed the first active section of angular extension β1. The downshift lever 212a, once released, returns into position by the return spring 236.

The described indexing mechanism, therefore, allows there to be an active pulling step corresponding to a percentage equal to β1/(β1+β2) (~38%) with respect to the entire pulling step of known active mechanisms.

Basically, at each recess 273 a hooking path for the pointer is thus defined formed from each ball 210, with stop positions at the stop zones $274^I$-$274^{VII}$ interspaced by free sliding paths formed from sections like the section A1", at the circumferential free sliding sections $244^I$-$244^{VII}$, and from active sliding paths formed from sections like the section A1', close to the recess 273.

The values of β1 and β2 of the above case are linked to the inclination α1 of the second inclined sliding section $245^I$-$245^{VI}$. The inclination α1 is selected based upon the outward radial pushing force of the springs 275 that must be overcome during upward gearshifting (for the above case the radial pushing force of each spring 275 on the respective ball 210 is about 2.5 N). In the case of use of different springs 275 with different radial pushing forces, the inclination α1 of the second inclined sliding section shall be different. More specifically, the greater the radial push of the springs 275 the greater the inclination α1 of the second inclined sliding section shall be.

Extreme values for β1, β2 and α1 can be selected equal to β1=β2=12.9° and α1=73° corresponding to an active push percentage of 50% with respect to known active mechanisms.

Also in downward gearshifting, in the same way as what has been seen for the case previously described, multiple gearshifting is possible.

The above are two example embodiments of the invention, but other embodiments are certainly possible. Some indications, however not to be considered in the limiting sense, shall be given hereafter. Two particularly interesting embodiments are illustrated in FIGS. 17 to 19.

Figure 17:
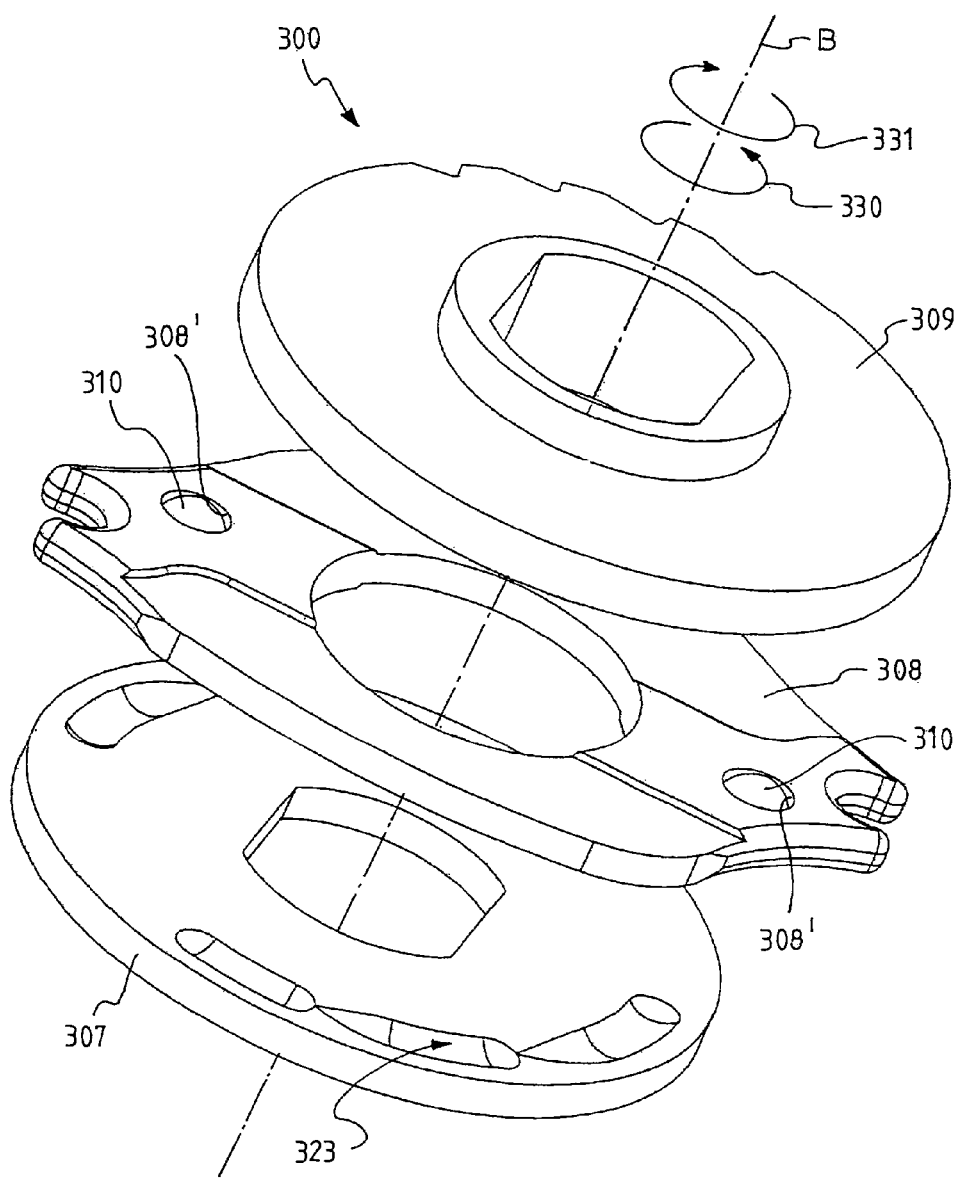
FIGS. 17 to 19 show details of embodiments of the previous devices. More specifically.
Figure 18:
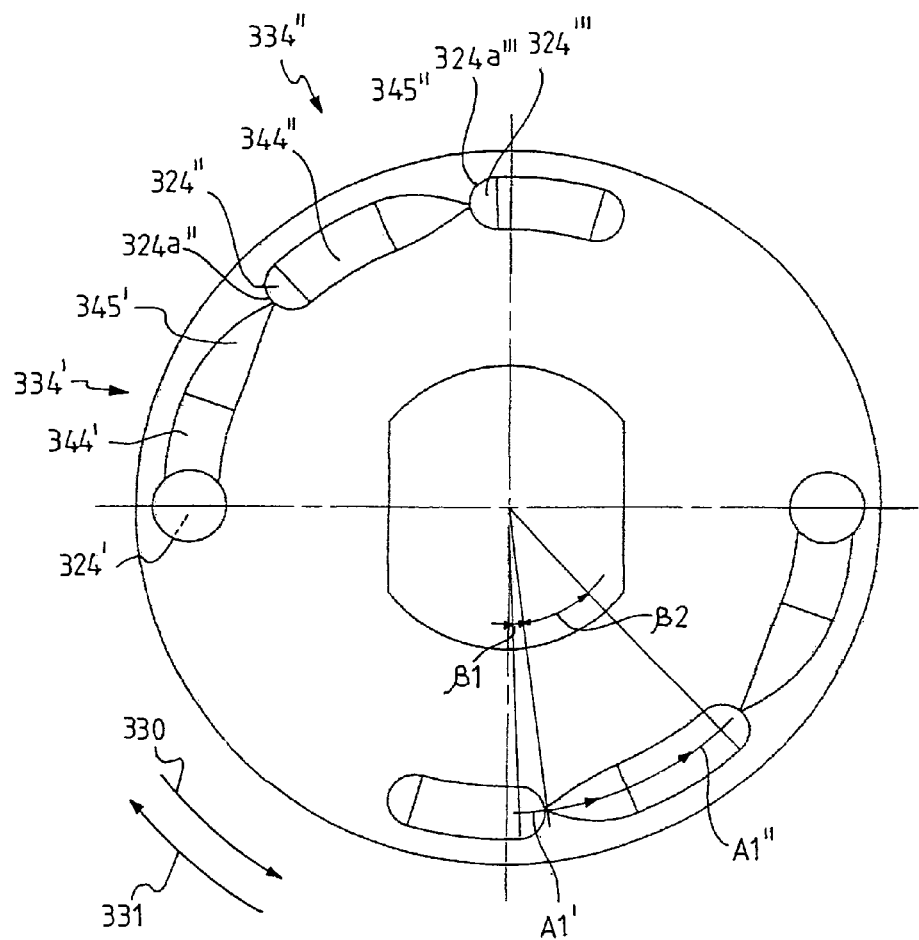
Figure 19:
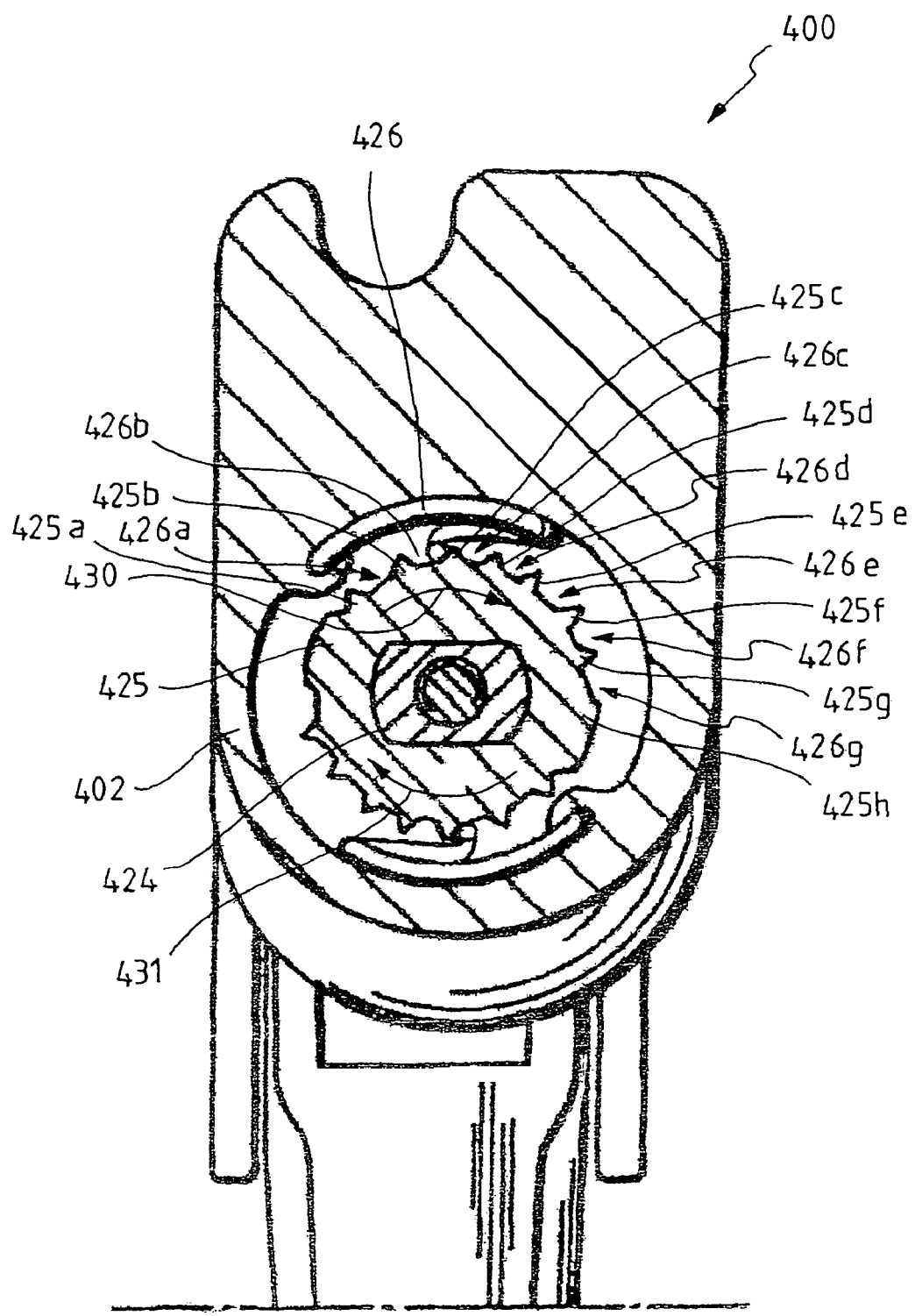
Figure 14:
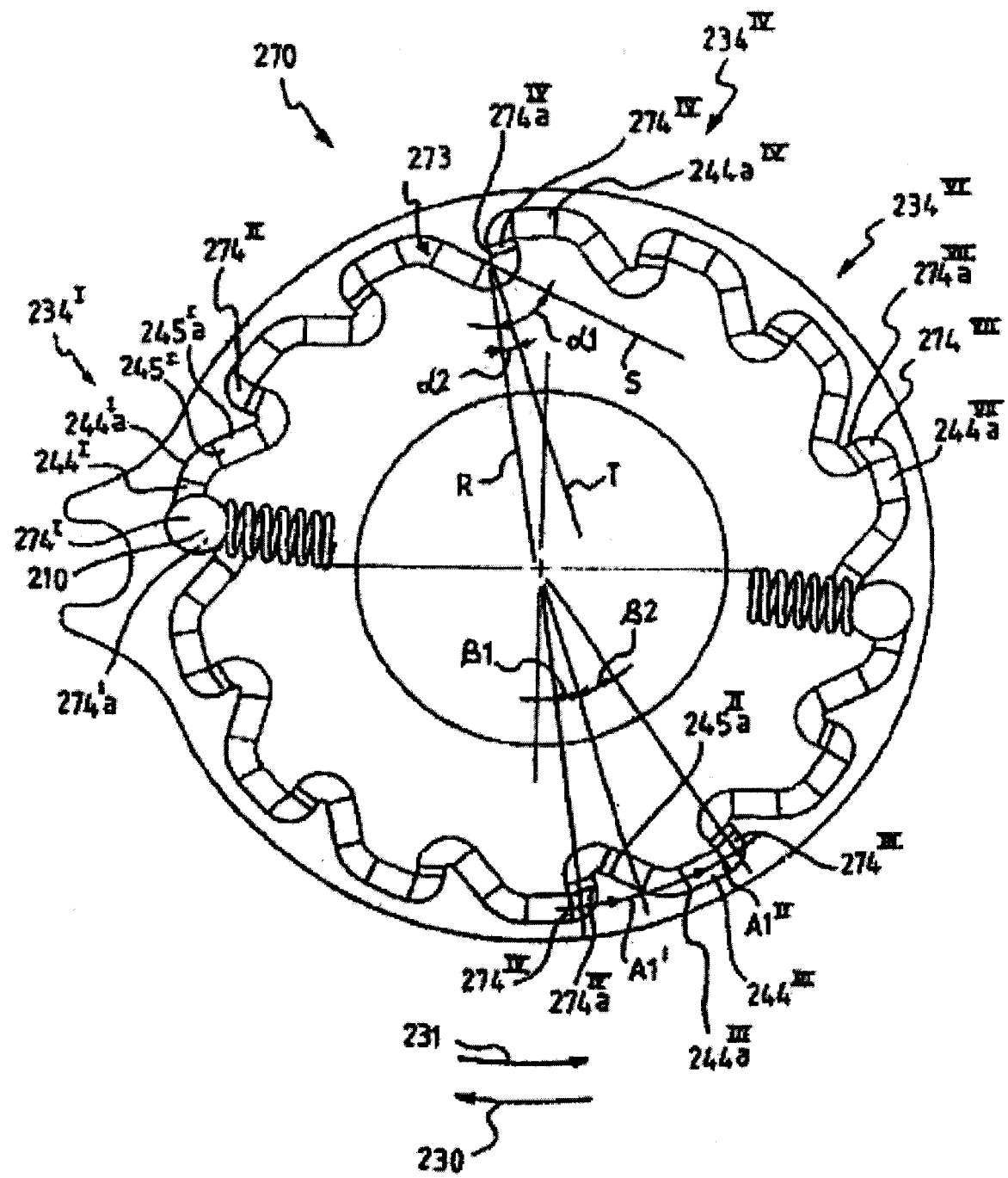
Figure 18:
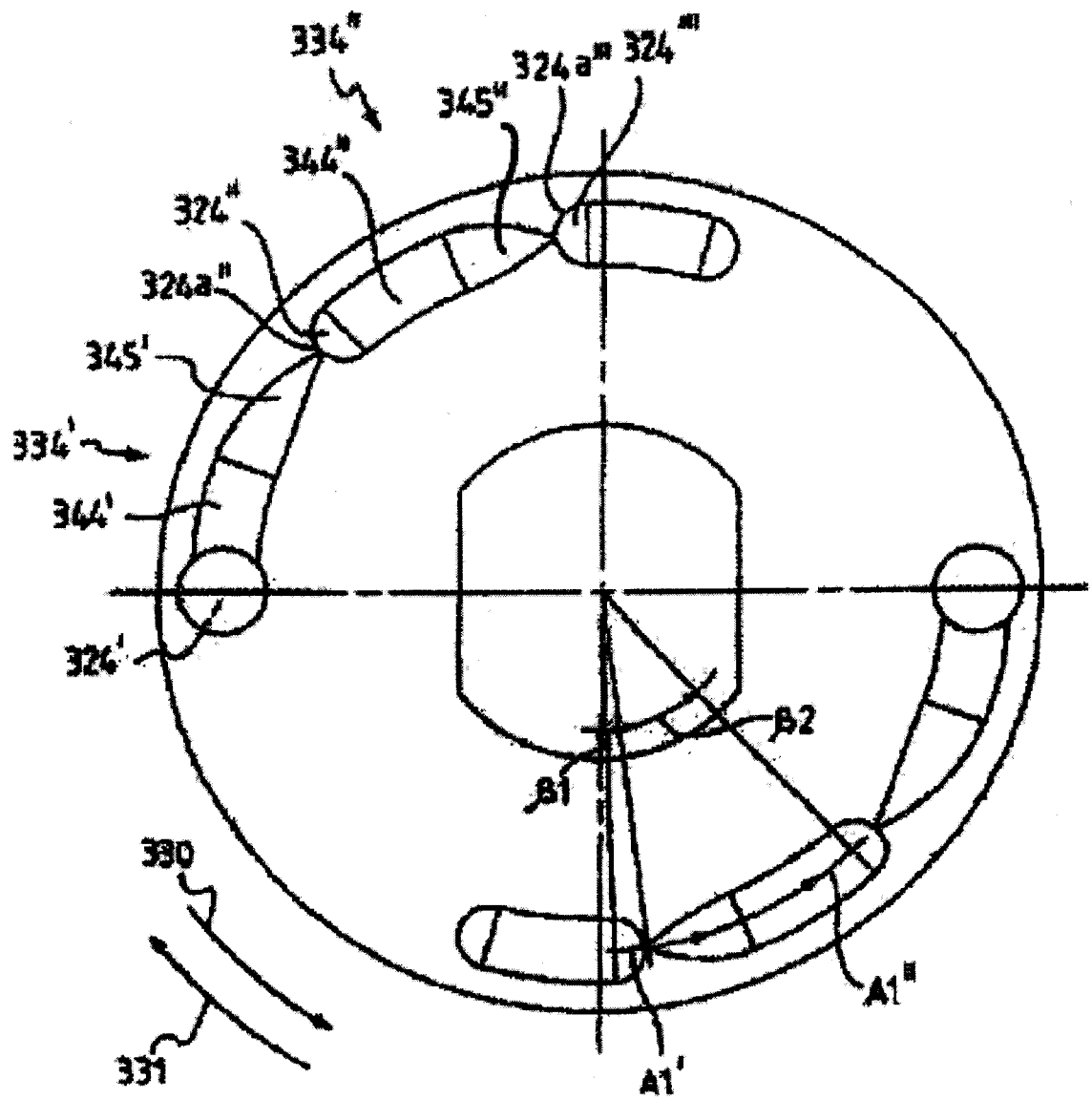

The embodiment of FIGS. 17 and 18 refers to a control device 300 for a front derailleur and differs from the embodiment of FIGS. 1 to 8 by the different design of the indexer. It should be noted that only some details of the device 300 are illustrated in the figures and distinguished by specific reference numerals, meaning that the other details that are not illustrated are the same as the corresponding details of the device 100 of FIGS. 1 to 8.

In greater detail, grooves 323 are provided on the indexing discs instead of recesses and the shape of the ball-carrying disc 308 is also different. Moreover, the first counteraction means (125 of the embodiment of FIGS. 1 to 8) are not present.

The groove 323 of each indexing disc 307 and 309 extends circumferentially on the respective disc. The ball 310 is housed in fixed position in the radial direction on the ball-carrying disc 308, inside a through seat 308'.

Every groove 323 has a width and depth such as to receive the balls 310, or rather the portion of such balls 310 that projects from the through seat 308' of the disc 308, and comprises three stop zones 324', 324", 324''' alternating with two sliding zones 334' and 334".

Each sliding zone 334' and 334" in turn comprises a first deep section 344' and 344", adjacent to the stop zone, and a second inclined section 345' and 345", adjacent to the deep section. The depth of the groove 323 has a maximum value in the stop zones 324', 324", 324''' and in the deep sections 344' and 344", whereas it is variable from a minimum value to the maximum value in the inclined sections 345' and 345". The minimum value is equal to zero in the example illustrated in the figures, but it can certainly also be different.

Along the groove 323 a circumferential hooking outline for the pointer is thus defined formed from the balls 310, with stop positions at the stop zones 324', 324", 324''', interspaced by free sliding paths along both the deep sections 344' and 344" and the inclined sections 345' and 345". No actual active sliding paths are provided, since the active sliding is limited to just passing over the change in depth between a stop position and the start of an inclined section.

In the case of upward gearshifting, the operation is as follows.

During the first actuation step on the lever 118a, the drum 104 and the indexing discs 307 and 309 are placed in rotation in the angular direction 330 whereas the balls 310 circumferentially cross the first deep section 344". Continuing with the action on the lever 118a, the balls 310 circumferentially cross the inclined section 345" and cause an axial push on the indexing discs 307 and 309 in the sense of their separation, in contrast to the springs 127. As the action of the cyclist on the lever 118a continues, the rotation of the drum 104 progressively proceeds, the balls 310 thus cross the entire sliding zone 334", finally reaching the height of the stop zone 324''', where they are positioned and where the indexing discs 307 and 309 simultaneously go back into the closed condition under the action of the springs 127.

In the case of downward gearshifting, on the other hand, the balls 310 go back along the hooking outline in the groove 323.

In the first actuation step of the downshift lever 112a by the cyclist, i.e. the rotation of the lever 112a in the angular direction 331, the balls 310 push on the stop walls 324"a causing an axial push on the indexing discs 307 and 309 causing them to separate, against the action of the springs 127. If the cyclist exerts sufficient traction to overcome the contrasting action of the axial springs 127, the indexing discs 307 and 309 go from the closed condition of FIG. 7 to the open condition of FIG. 8. In this condition of discs open, the counteraction force exerted by the springs 127 on the discs 307 and 309 and the friction between the balls 310 and the two discs 307 and 309 prevent the rotation of the balls 310. The cyclist actively acts by pushing upon the downshift lever 112a, and thus on the indexing discs 307 and 309, so that the balls 310 cross the section A1'. During such an active pulling step by the cyclist, the balls 310 cross a first active section of angular extension β1. As soon as the balls 310 reach the inclined section 345", the two discs 307, 309 tend to return to the closed condition of FIG. 7 and the drum 104 and the indexing discs 307, 309 rotate freely, subjected to the traction force of the return spring of the derailleur transmitted by the cable K. The free rotation takes place both along the inclined section 345" and along the deep section 344" for an angular extension β2 until the balls 310, having crossed the section A1", reach the stop zone 324".

The embodiment of FIG. 19 refers to a device 400 for curved handlebars, in which the indexer of such a device comprise two needle springs that cooperate with the toothed surface of a wheel fitted to the drive shaft of the device; the toothed surface consists of a plurality of spaces separated by teeth.

In the device 400 according to this embodiment of the invention, the periphery of a sprocket 425 is provided with teeth 425a-425h alternating with spaces 426a-426g. Two needle springs 426 are mounted in a casing 402 around the sprocket 425, with respective ends that rest elastically on the toothed surface of the sprocket 425.

When the ends of the needle springs 426, substantially in discharged condition, are in the spaces 426a-426g, resting against the teeth 425a-425h, the drive shaft 424 is held in a stable position, corresponding to a certain transmission ratio.

When upward gearshifting is carried out, the drive shaft 424 and the sprocket 425 are placed in rotation (in the clockwise direction, with respect to FIG. 19). With reference to the position of FIG. 19, during upward gearshifting the ends of the needle springs 426, which are resting against the third tooth 425c and are substantially discharged, slide inside the second space 426b until they reach the second tooth 425b. The pushing of the drive shaft 424 by the cyclist by the upshift lever, allows the second tooth 425b to be passed over by the end of the needle spring 426 and allows it to be positioned beyond the second tooth 425b and resting against it to make a new stable position.

When downward gearshifting is carried out, again starting from the position shown in FIG. 19, the drive shaft 424 and the sprocket 425 are placed in rotation in the counter-clockwise direction. During the first step, the ends of the needle springs 426 are pushed radially outwards by the tooth 425c and the pushing of the drive shaft by the cyclist through the upshift lever allows the third tooth 425c to be passed over by the end of the needle spring 426 and allows it to be positioned inside the third space 426c. From such a time, the sprocket 425 and the drive shaft 424 rotate freely, subjected to the traction force on the cable K exerted by the return spring of the derailleur. The free rotation takes place for the entire angular extension of the third space 426c until the ends of the needle springs 426 are arranged abutting against the fourth tooth 425d to set a new stable position.

On the periphery of the sprocket 425 a circumferential hooking outline for the pointer is thus defined formed from the ends of the needle springs 426, with stop positions at the teeth 425a-425h, interspaced by free sliding paths along the spaces 426a-426g. No actual active sliding paths are provided, since the active sliding is limited to just passing over the teeth 425a-425h.

With the device 400, downward gearshifting is extremely quick upon actuation by the cyclist, since it is completed automatically as soon as the cyclist has completed a minimum rotation, sufficient to cause the tooth to be passed over. Moreover, the risk of the wheel carrying out only a partial rotation, leaving the gearshift in a disadvantageous intermediate position between two ratios, is avoided.

As stated, the example embodiments of the invention illustrated above are not the only possible ones.

An alternate device can have two indexing discs like the device 100, but stationary like in the device 200, with a rotary ball-carrying disc. Alternatively, another alternate device can have just one indexing disc like the device 200, but rotary like in the device 100, with a stationary ball-carrying disc.

Such devices can indifferently be adopted to control a rear or front gearshift, the only restriction being that of the number of stop zones.

The toothed sector on which the pawl of an operating mechanism acts can be formed on any element of the rotary member with the cable-winding drum, be it an element already present for other functions (like the ball-carrying disc 280 of the device 200) or an additional disc.

The first counteraction springs that push the balls radially outwards can be of various types (helical, leaf or other) irrespective of the other characteristics of the device.

The second counteraction Belleville springs that axially push the discs against each other can also be replaced by different elastic systems, such as groups of helical springs, elastomeric rings, etc.

The balls could also be replaced by members (skids or tappets) that do not rotate but slide, with a consequent increase in friction. In such a case, the sliding members could advantageously be integral or in a single piece with the first counteraction springs.

The device can also be provided with an internal spring that pushes and helps the cable-winding drum in the unwinding direction.

The indexer of the device of the invention could be applied to an actuation device in which the cable-winding drum does not rotate about a central shaft, like in the solutions described here, but is centered with respect to its rotation axis by means of a collar arranged outside and in an intermediate position along the cable-winding drum itself.

In a variant embodiment it is possible to provide the use of levers in the form of buttons in which the stroke of the lever takes place along a substantially rectilinear direction instead of along an arc of circumference, as the actuation levers described above.

What is claimed is:

1. Actuation device for a control cable for a bicycle derailleur, comprising:
    a casing, attachable to a handlebar of the bicycle,
    a cable-winding drum, angularly mobile in the casing about a main axis of the device,
    at least one actuator, active on the drum to rotate it in a first and in a second angular direction about the main axis of the device,
    an indexer to releasably hold the drum in predetermined angular positions, against a return action, in the second angular direction, exerted by a biasing member,
    wherein said indexer comprises:
        a first rotary member integral in rotation with the drum and a second stationary member integral with the casing, wherein one of the first and the second members is provided with a pointer engaged on a hooking outline formed on the other member, the hooking outline comprising a plurality of stop positions corresponding to the predetermined angular positions of the drum and a plurality of free sliding paths, interspaced between stop positions, having a circumferential free sliding section and an inclined sliding section,
        wherein the shape and the location of the stop positions and of the free sliding paths are such that the rotation of the drum in the second angular direction provides an active initial movement step, wherein the rotary member can only move if forced in rotation by the at least one actuator so that the pointer is taken to disengage from a stop position, and an automatic final movement step, wherein the rotary member is free to rotate in the second direction without the need for further action by the actuator, with the pointer that runs along the free sliding path that follows a stop position from which it has been disengaged to a subsequent stop position.

2. Device according to claim 1, wherein each free sliding path has an angular extension of more than 50% of the angular extension between the two stop positions adjacent to it.

3. Device according to claim 1, wherein the indexer comprises a disc provided with said pointer, flanked on at least one of its two opposite sides by a disc comprising said hooking outline, wherein the pointer is an element projecting in the axial direction from the disc on which it is provided and wherein the hooking outline is defined at a recess formed in the disc on which it is provided.

4. Device according to claim 3, wherein the stationary member comprises the disc provided with the pointer and the rotary member comprises the disc provided with the hooking outline.

5. Device according to claim 3, wherein the at least one actuator comprises:
a first operating mechanism, active on the drum to rotate it in the first angular direction,
a second operating mechanism, active on the drum to rotate it in the second angular direction opposite the first;
and wherein the indexer comprises:
first counteraction means, to counteract the rotation of the drum in the first direction,
second counteraction means, to counteract the rotation of the drum in the second direction.

6. Device according to claim 5, wherein the pointer is a ball and the disc provided with the pointer is a ball-carrying disc, mounted in the casing and provided with at least one radial slot, with said ball mounted in said radial slot so as to be pushed radially outwards by the first counteraction means, the slot being open on at least one side of the ball-carrying disc and having a depth such that the ball projects in the axial direction from the ball-carrying disc, and wherein the disc provided with the hooking outline is a first indexing disc, mounted in the casing in a position flanking and adjacent to the ball-carrying disc, towards the side thereof from which the ball projects, and provided with said recess in which the ball is engaged.

7. Device according to claim 6, wherein
the slot in the ball-carrying disc is open on both sides of such a disc and has a depth such that the ball projects in the axial direction from the ball-carrying disc, from both sides thereof; wherein
the indexer also comprises a second indexing disc integral in rotation with the first indexing disc, mounted in the casing in a position flanking and adjacent to the ball-carrying disc on the opposite side with respect to the first indexing disc and provided with a recess mirroring that of the first indexing disc; and wherein
the ball, projecting axially from the slot on the ball-carrying disc, is engaged both in the recess on the first indexing disc, and in the recess on the second indexing disc.

8. Device according to claim 6, wherein the recess formed in the first indexing disc comprises a plurality of stop zones interspaced by sliding zones, each of these in turn comprising a circumferential free sliding section and an inclined sliding section, wherein the stop positions of the hooking outline are defined in the stop zones of the recess and the free sliding paths are defined along the circumferential free sliding sections.

9. Device according to claim 8, wherein:
the first counteraction means comprise a first counteraction spring that acts on the ball in the radial slot of the ball-carrying disc to keep the ball itself in a stop zone in the recess, thus making the stationary member and the rotary member integral in rotation.

10. Device according to claim 9, wherein the first counteraction spring is a leaf spring mounted on the ball-carrying disc and active on the ball.

11. Device according to claim 9, wherein the ball-carrying disc comprises a further ball engaged in a further recess formed in the indexing disc, and wherein the first counteraction spring is a single leaf spring mounted on the ball-carrying disc and active between the two balls.

12. Device according to claim 11, wherein:
the slots in the ball-carrying disc are open on both sides of such a disc and have a depth such that the balls project in the axial direction from the ball-carrying disc, from both sides thereof; wherein
the indexer also comprises a second indexing disc integral in rotation with the first indexing disc, mounted in the casing in a position flanking and adjacent to the ball-carrying disc on the opposite side with respect to the first indexing disc and provided with a recess mirroring that of the first indexing disc; and wherein
the balls, projecting axially from the slots on the ball-carrying disc, are engaged both in the recess on the first indexing disc, and in the recess on the second indexing disc.

13. Device according to claim 9, wherein the second counteraction spring is a Belleville spring, arranged coaxially to the ball-carrying disc and to the first indexing disc.

14. Device according to claim 8, wherein:
the second counteraction means comprise a second counteraction spring mounted in the casing so as to axially bias the first indexing disc and the ball-carrying disc against each other.

15. Device according to claim 8, wherein an intermediate of the stop zones is delimited by a stop wall oriented in a stop direction and by a the circumferential sliding wall oriented circumferentially about the axis of the device.

16. Device according to claim 15, wherein each of the sliding zones is delimited—at the circumferential free sliding section—by said circumferential sliding wall and—at the inclined sliding section—by an inclined sliding wall oriented in a sliding direction, the stop direction of a stop zone and the sliding direction of the inclined sliding section separated from the aforementioned stop zone by a circumferential free sliding section defining an acute angle that does not enclose the main axis of the device.

17. Device according to claim 16, wherein the stop walls are joined to the sliding walls in a succession that forms an outer peripheral margin of the recess on the indexing disc.

18. Device according to claim 17 wherein the recess on the indexing disc is delimited towards the inside by an inner peripheral margin corresponding to the outer peripheral margin.

19. Device according to claim 1, wherein the indexer comprises a pair of pointers and a corresponding pair of hooking outlines.

20. Device according to claim 1, wherein the indexer comprises a disc provided with said pointer, flanked on at least one of its two opposite sides by a disc provided with said hooking outline, wherein the pointer is an element projecting in the axial direction from the disc on which it is provided, and wherein the hooking outline is defined along a groove extending circumferentially, having a variable depth between a minimum value and a maximum value.

21. Device according to claim 20, wherein the stationary member comprises the disc provided with the pointer and the rotary member comprises the disc provided with the hooking outline.

22. Device according to claim 20, comprising a pair of pointers and a corresponding pair of hooking outlines.

23. Device according to claim 20, wherein the pointer is a ball and the disc provided with the pointer is a ball-carrying disc having a through seat in which said ball is housed, the ball having a greater diameter than the thickness of the ball-carrying disc and projecting from the disc on both sides thereof, and wherein the disc provided with the hooking outline is a first indexing disc, mounted in the casing in a position flanking and adjacent to the ball-carrying disc, towards the side thereof from which the ball projects, and provided with said groove in which the ball is engaged.

24. Device according to claim 23, wherein the groove comprises stop zones interspaced by sliding zones, each of these in turn comprising a recessed section adjacent to the stop zone and an inclined section adjacent to the recessed section, wherein the depth of the groove has its maximum value in the stop zones and in the recessed sections, whereas it is variable from the minimum value to the maximum value in the inclined sections.

25. Integrated control device, comprising an actuation device according to claim 1 integrated with a brake control of a bicycle.

26. A device for controlling a bicycle derailleur, the device comprising:
   a) a casing that is configured to be attached to a bicycle handlebar which generally defines a horizontal reference plane and a main axis that is angled in relationship to the horizontal reference plane;
   b) a cable-winding drum that rotates in clockwise and counter clockwise directions about the main axis of the device;
   c) at least one actuator to selectively rotate the drum about the main axis of the device; and
   d) a holding assembly that retains the drum in predetermined positions; the holding assembly comprises:
      i) opposed members, one being a stationary member and the other being a rotary member that rotates with the drum, that are on centerline with the main axis of the device, one member having a plurality of stop positions, corresponding to a plurality of predetermined drum positions, separated by free sliding paths, interspaced between stop positions, having a circumferential free sliding section and an inclined sliding section, and the other member has a retainer for engaging the stop positions; the stop positions and free sliding paths are shaped and located so that a rotation of the drum in one of the clockwise and counter clockwise directions can only be achieved when the actuator displaces the retainer from a stop position, and the rotary member is free to rotate in the other one of the clockwise and counter clockwise directions until the retainer moves along the free sliding path between the stop position from which it disengaged and a subsequent stop position and engages the subsequent stop position.

27. The device of claim 26, wherein each free sliding path has an angular extension of more than 50% of the angular extension between the two stop positions adjacent to it.

28. The device of claim 26, wherein the holding assembly comprises a pair of retainers and a pair of corresponding recesses comprised of the free sliding paths and stop positions.

29. The device of claim 28, wherein the at least one actuator comprises:
   a first operating mechanism, active on the drum to rotate it one of the clockwise or counter-clockwise direction,
   a second operating mechanism, active on the drum to rotate it in the other one of the clockwise or counter-clockwise direction;
and wherein the holding assembly comprises:
   a first counteraction element, to counteract the rotation of the drum in one of the clockwise or counter-clockwise direction,
   a second counteraction element, to counteract the rotation of the drum in the other one of the clockwise or counter-clockwise direction.

30. The device of claim 29, wherein the retainer is a ball and one of the opposed members is a ball-carrying disc, mounted in the casing and provided with at least one radial slot, with said ball mounted in said radial slot so as to be pushed radially outwards by the first counteraction element, the slot being open on at least one side of the ball-carrying disc and having a depth such that the ball projects in the axial direction from the ball-carrying disc, and wherein one of the members is provided with a hooking outline of the recesses and is a first indexing disc, mounted in the casing in a position flanking and adjacent to the ball-carrying disc, towards the side thereof from which the ball projects, and provided with said recess in which the ball is engaged.

31. The device of claim 30, wherein the recess formed in the first indexing disc comprises a plurality of stop zones interspaced by sliding zones, each of these in turn comprising the circumferential free sliding section and the inclined sliding section, wherein the stop positions of the hooking outline are defined in the stop zones of the recess and the free sliding paths are defined along the circumferential free sliding sections.

32. The device of claim 30, wherein:
   the second counteraction element comprises a counteraction spring mounted in the casing so as to axially bias the first indexing disc and the ball-carrying disc against each other.

33. The device of claim 30, wherein an intermediate portion of the stop zones is delimited by a stop wall oriented in a stop direction and by a circumferential sliding wall oriented circumferentially about the axis of the device.

34. The device of claim 33, wherein each of the sliding zones is delimited—at the circumferential free sliding section—by said circumferential sliding wall and—at the inclined sliding section—by an inclined sliding wall oriented in a sliding direction, the stop direction of a stop zone and the sliding direction of the inclined sliding section separated from the aforementioned stop zone by a circumferential free sliding section defining an acute angle that does not enclose the main axis of the device.

35. The device of claim 34, wherein the stop walls are joined to the sliding walls in a succession that forms an outer peripheral margin of the recess on the indexing disc.

36. The device of claim 35 wherein the recess on the indexing disc is delimited towards the inside by an inner peripheral margin corresponding to the outer peripheral margin.

37. Actuation device for a control cable for a bicycle derailleur, comprising:
   a casing, attachable to a handlebar of the bicycle,
   a cable-winding drum, angularly mobile in the casing about a main axis of the device,
   at least one actuator, active on the drum to rotate it in a first and in a second angular direction about the main axis of the device, the actuator comprising:
      a first operating mechanism, active on the drum to rotate it in the first angular direction,
      a second operating mechanism, active on the drum to rotate it in the second angular direction opposite the first;
   an indexer to releasably hold the drum in predetermined angular positions, against a return action, in the second angular direction, exerted by a biasing member, the indexer comprising:
      first counteraction means, to counteract the rotation of the drum in the first direction,
      second counteraction means, to counteract the rotation of the drum in the second direction;
      a first rotary member integral in rotation with the drum and a second stationary member integral with the casing, wherein one from the first and second member is a ball-carrying disc and the other one is an indexing disc, the ball-carrying disc being provided with a ball engaged on a hooking outline defined by a recess formed on the indexing disc, the hooking outline comprising a plurality of stop positions corresponding to the predetermined angular positions of the drum and a plurality of free sliding paths having circumferential and inclined sections, wherein the ball-carrying disc is mounted in the casing and has at least one radial slot and the ball is mounted within the at least one radial slot, said ball being pushed radially outwards by the first counteraction means, the slot is open on at least one side of the ball-carrying disc and is dimensioned such that the ball projects in the axial direction from the ball-carrying disc and engages the hooking outline formed on the first indexing disc which flanks and is adjacent to the ball-carrying disc, towards the side from which the ball projects, wherein the shape and the location of the stop positions and of the free sliding paths are such that the rotation of the drum in the second angular direction provides an active initial movement step, wherein the first rotary member can only move if forced in rotation by the at least one actuator so that the ball is taken to disengage from a stop position, and an automatic final movement step, wherein the first rotary member is free to rotate in the second direction without the need for further action by the actuator, with the ball that runs along the free sliding path that follows a prior stop position from which it has been disengaged to a subsequent stop position.

38. Actuation device for a control cable for a bicycle derailleur, comprising:

a casing, attachable to a handlebar of the bicycle, a cable-winding drum, angularly mobile in the casing about a main axis of the device, at least one actuator, active on the drum to rotate it in a first and in a second angular direction about the main axis of the device, the actuator comprising:

a first operating mechanism, active on the drum to rotate it in the first angular direction, a second operating mechanism, active on the drum to rotate it in the second angular direction opposite the first;

an indexer to releasably hold the drum in predetermined angular positions, against a return action, in the second angular direction, exerted by a biasing member, the indexer comprising:

first counteraction means, to counteract the rotation of the drum in the first direction, second counteraction means, to counteract the rotation of the drum in the second direction;

a first rotary member integral in rotation with the drum and a second stationary member integral with the casing, wherein one from the first and second member is a ball-carrying disc and the other one is an indexing disc, the ball-carrying disc being provided with a ball engaged on a hooking outline defined by a recess formed on the indexing disc, the hooking outline comprising a plurality of stop positions corresponding to the predetermined angular positions of the drum and a plurality of free sliding paths having circumferential and inclined sections, wherein the ball-carrying disc is mounted in the casing and has at least one radial slot and the ball is mounted within the at least one radial slot, said ball being pushed radially outwards by the first counteraction means, the slot is open on at least one side of the ball-carrying disc and is dimensioned such that the ball projects in the axial direction from the ball-carrying disc and engages the hooking outline formed on the first indexing disc which flanks and is adjacent to the ball-carrying disc, towards the side from which the ball projects, the recess comprising a plurality of stop positions corresponding to the predetermined angular positions of the drum interspaced by sliding zones, each of which in turn comprising a circumferential free sliding section and an inclined sliding section, wherein the stop positions of the hooking outline are defined in the stop zones of the recess and the free sliding paths are defined along the circumferential free sliding sections, and wherein the shape and the location of the stop positions and of the free sliding paths are such that the rotation of the drum in the second angular direction provides an active initial movement step, wherein the first rotary member can only move if forced in rotation by the at least one actuator so that the ball is taken to disengage from a stop position, and an automatic final movement step, wherein the first rotary member is free to rotate in the second direction without the need for further action by the actuator, with the ball that runs along the free sliding path that follows a prior stop position from which it has been disengaged to a subsequent stop position.

39. Actuation device for a control cable for a bicycle derailleur, comprising:

a casing, attachable to a handlebar of the bicycle, a cable-winding drum, angularly mobile in the casing about a main axis of the device, at least one actuator, active on the drum to rotate it in a first and in a second angular direction about the main axis of the device, the actuator comprising:

a first operating mechanism, active on the drum to rotate it in the first angular direction, a second operating mechanism, active on the drum to rotate it in the second angular direction opposite the first;

an indexer to releasably hold the drum in predetermined angular positions, against a return action, in the second angular direction, exerted by a biasing member, the indexer comprising:

first counteraction means, to counteract the rotation of the drum in the first direction, second counteraction means, to counteract the rotation of the drum in the second direction;

a first rotary member integral in rotation with the drum and a second stationary member integral with the casing, wherein one from the first and second member is a ball-carrying disc and the other one is an indexing disc, the ball-carrying disc being provided with a ball engaged on a hooking outline defined by a recess formed on the indexing disc, the hooking outline comprising a plurality of stop positions corresponding to the predetermined angular positions of the drum and a plurality of free sliding paths having circumferential and inclined sections, wherein the ball-carrying disc is mounted in the casing and has at least one radial slot open on both sides of such a disc and has a depth such that the ball projects in the axial direction from the ball-carrying disc, from both sides thereof; wherein the indexer also comprises a second indexing disc integral in rotation with the first indexing disc, mounted in the casing in a position flanking and adjacent to the ball-carrying disc on the opposite side with respect to the first indexing disc and provided with a recess mirroring that of the first indexing disc; and wherein the ball, projecting axially from the slot on the ball-carrying disc, is engaged both in the recess on the first indexing disc, and in the recess on the second indexing disc, wherein the shape and the location of the stop positions and of the free sliding paths are such that the rotation of the drum in the second angular direction provides an active initial movement step, wherein the first rotary member can only move if forced in rotation by the at least one actuator so that the ball is taken to disengage from a stop position, and an automatic final movement step, wherein the first rotary member is free to rotate in the second direction without the need for further action by the actuator, with the ball that runs along the free sliding path that follows a prior stop position from which it has been disengaged to a subsequent stop position.

* * * * *

UNITED STATES PATENT AND TRADEMARK OFFICE
CERTIFICATE OF CORRECTION

Page 1 of 3

PATENT NO. : 8,061,233 B2
APPLICATION NO. : 11/499545
DATED : November 22, 2011
INVENTOR(S) : Dal Prà et al.

It is certified that error appears in the above-identified patent and that said Letters Patent is hereby corrected as shown below:

On the title page, at section (75), under Inventors, in line 1, after the words "Dal Prà," delete "Venice" and insert therefor --Zanè, Vicenza--.

On the title page, at section (75), under Inventors, in line 2, after the words "Piovene Rocchette", insert --Vicenza--.

On the title page, at section (57), under Abstract, in line 3, after the word "the", delete "derailler" and insert therefor --derailleur--.

In Fig. 14, on drawing sheet 15 of 20, insert a referral line with an arrow for reference numeral $234^I$ pointing to the sliding zone between stop zones $274^I$ and $274^{II}$, as shown on attached page.

In Fig. 18, on drawing sheet 19 of 20, insert a referral line for reference numeral $345^{II}$ pointing to the inclined section adjacent to the deep section $344^{II}$, as shown on attached page.

At col. 4, line 44, line 44, after the word "rest", delete "position." and insert therefor --position;--.
At col. 10, line 35, after the words "known as", delete "seger" and insert therefor --seeger--.
At col. 15, line 58, after the words "known as", delete "seger" and insert therefor --seeger--.
At col. 16, line 64, after the words "stop wall", delete "$274^{IV}$" and insert therefor --$274^{IV}a$--.
At col. 17, line 1, after the words "stop wall", delete "$274^{IV}$" and insert therefor --$274^{IV}a$--.
In claim 15, at col. 24, line 19, after the word "and", delete "by a the" and insert therefor --by a--.
In claim 18, at col. 24, line 33, after the word "claim", delete "17" and insert therefor --17,--.
In claim 36, at col. 26, line 37, after the word "claim", delete "35" and insert therefor --35,--.

Signed and Sealed this
Twentieth Day of March, 2012

David J. Kappos
*Director of the United States Patent and Trademark Office*